(12) United States Patent
Takao et al.

(10) Patent No.: US 11,330,188 B2
(45) Date of Patent: *May 10, 2022

(54) CAMERA

(71) Applicant: FUJIFILM Corporation, Tokyo (JP)

(72) Inventors: Hiroaki Takao, Saitama (JP); Kentaro Tokiwa, Saitama (JP); Hirofumi Horii, Saitama (JP); Yuichi Fujimura, Saitama (JP); Takeshi Misawa, Saitama (JP); Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/032,885

(22) Filed: Sep. 25, 2020

(65) Prior Publication Data

US 2021/0014400 A1 Jan. 14, 2021

Related U.S. Application Data

(63) Continuation of application No. 16/785,135, filed on Feb. 7, 2020, now Pat. No. 10,873,705, which is a
(Continued)

(30) Foreign Application Priority Data

Mar. 15, 2016 (JP) .............................. JP2016-051285

(51) Int. Cl.
*H04N 5/235* (2006.01)
*G03B 17/02* (2021.01)
(Continued)

(52) U.S. Cl.
CPC ......... *H04N 5/2351* (2013.01); *G02F 1/1313* (2013.01); *G03B 13/08* (2013.01);
(Continued)

(58) Field of Classification Search
CPC .. H04N 5/2351; H04N 5/2252; H04N 5/2251; H04N 5/23293; H04N 5/2354;
(Continued)

(56) References Cited

U.S. PATENT DOCUMENTS

| 5,742,853 A * | 4/1998 | Haga ...................... G03B 17/18 |
| | | 345/684 |
| 6,075,951 A | 6/2000 | Maruyama et al. |

(Continued)

FOREIGN PATENT DOCUMENTS

| CN | 105224272 A | 1/2016 |
| JP | 8-76225 A | 3/1996 |

(Continued)

OTHER PUBLICATIONS

Chinese Office Action and Search Report, dated Apr. 17, 2019, for counterpart Chinese Application No. 201780016798.0, with an English translation.
(Continued)

*Primary Examiner* — Lin Ye
*Assistant Examiner* — John H Morehead, III
(74) *Attorney, Agent, or Firm* — Birch, Stewart, Kolasch & Birch, LLP

(57) ABSTRACT

There is provided a camera of which operability is good regardless of the brightness of the surrounding environment. The brightness of the surrounding environment is detected by a brightness detection unit provided in a camera. The contents of settings of the camera are displayed on a sub-display 18 in a situation in which the surrounding environment is bright. The contents of settings of the camera and an image representing the set state of a shutter speed dial 33 are displayed on the sub-display 18 in a case in which the surrounding environment is dark.

20 Claims, 23 Drawing Sheets

Related U.S. Application Data continuation of application No. 16/130,162, filed on Sep. 13, 2018, now Pat. No. 10,616,494, which is a continuation of application No. PCT/JP2017/009576, filed on Mar. 9, 2017.

(51) Int. Cl.

| | | |
|---|---|---|
| *H04N 5/225* | (2006.01) | |
| *H04N 5/232* | (2006.01) | |
| *G03B 17/18* | (2021.01) | |
| *H04N 21/47* | (2011.01) | |
| *G02F 1/13* | (2006.01) | |
| *G03B 13/08* | (2021.01) | |
| *G03B 13/10* | (2021.01) | |
| *H04N 21/485* | (2011.01) | |

(52) U.S. Cl.
CPC ............ *G03B 13/10* (2013.01); *G03B 17/02* (2013.01); *G03B 17/18* (2013.01); *H04N 5/2251* (2013.01); *H04N 5/2252* (2013.01); *H04N 5/2354* (2013.01); *H04N 5/23293* (2013.01); *H04N 21/47* (2013.01); *H04N 21/485* (2013.01)

(58) Field of Classification Search
CPC ........ H04N 21/47; G03B 17/02; G03B 17/18; G03B 13/08; G03B 13/10; G02F 1/1313
See application file for complete search history.

(56) References Cited

U.S. PATENT DOCUMENTS

| | | | | |
|---|---|---|---|---|
| 6,275,212 B1* | 8/2001 | Ohtani | ................... | G03B 17/18 345/110 |
| 6,510,287 B1* | 1/2003 | Tsukahara | .............. | G03B 17/18 396/281 |
| 6,809,759 B1* | 10/2004 | Chiang | .............. | H04N 5/23203 348/211.2 |
| 7,133,608 B1* | 11/2006 | Nagata | ................... | G03B 13/02 396/374 |
| 8,662,767 B2* | 3/2014 | Honjo | .................... | G03B 17/14 396/530 |
| 2003/0025802 A1* | 2/2003 | Mayer, Jr. | ................. | G03B 3/12 348/211.99 |
| 2005/0140813 A1* | 6/2005 | Wani | .................... | H04N 5/2252 348/333.12 |
| 2006/0055806 A1* | 3/2006 | Tsukahara | ........ | H04N 5/225251 348/333.06 |
| 2006/0159444 A1* | 7/2006 | Mokunaka | ....... | H04N 5/232939 396/299 |
| 2007/0200945 A1* | 8/2007 | Inukai | ................... | G03B 17/18 348/333.02 |
| 2008/0062284 A1* | 3/2008 | Fujio | ..................... | G03B 17/18 348/235 |
| 2008/0225158 A1* | 9/2008 | Ito | ...................... | H04N 5/23245 348/349 |
| 2008/0266439 A1* | 10/2008 | Okazaki | ................ | G03B 19/12 348/333.01 |
| 2009/0135295 A1* | 5/2009 | Kunishige | .......... | H04N 5/23232 348/362 |
| 2011/0200318 A1* | 8/2011 | Ichikawa | ............. | G09G 3/3406 396/296 |
| 2012/0139880 A1* | 6/2012 | Shirakawa | .............. | G06F 3/038 345/184 |
| 2012/0218312 A1* | 8/2012 | Goldsmith | ............ | G09G 3/344 345/690 |
| 2012/0236173 A1 | 9/2012 | Telek et al. | | |
| 2013/0155041 A1* | 6/2013 | Yanai | ............... | H04N 21/42202 345/207 |
| 2013/0235260 A1* | 9/2013 | Lakdawala | ........... | G06F 1/1684 348/373 |
| 2015/0109510 A1* | 4/2015 | Fujita | ..................... | G03B 17/02 348/333.02 |
| 2015/0282071 A1* | 10/2015 | Nakaya | ................. | G06F 1/3212 455/566 |
| 2016/0006923 A1* | 1/2016 | Imamura | .............. | H04N 5/2329 348/208.11 |
| 2016/0286139 A1* | 9/2016 | Tsuchiya | ................ | G03B 17/18 |

FOREIGN PATENT DOCUMENTS

| | | |
|---|---|---|
| JP | 2003-110882 A | 4/2003 |
| JP | 2004-40254 A | 2/2004 |
| JP | 2015-154323 A | 8/2015 |
| WO | WO 2014/002659 A1 | 1/2014 |

OTHER PUBLICATIONS

Chinese Office Action, dated Dec. 3, 2019, for corresponding Chinese Application No. 201780016798.0, with an English machine translation.

German Office Action for counterpart German Application No. 112017000819.0, dated May 21, 2019, with English translation.

International Preliminary Report on Patentability and Written Opinion of the International Searching Authority (Forms PCT/IB/326, PCT/IB/373, and PCT/ISA/237) For International Application No. PCT/JP2017/009576, dated Sep. 27, 2018, with English Translation.

International Search Report (form PCT/ISA/210) for International Application No. PCT/JP2017/009576, dated May 23, 2017, with English Translation.

Notice of Allowance dated Aug. 12, 2020 in corresponding U.S. Appl. No. 16/785,135.

Notice of Allowance dated Jan. 13, 2020 in corresponding U.S. Appl. No. 16/130,162.

Office Action dated Apr. 22, 2020 in corresponding U.S. Appl. No. 16/785,135.

Office Action dated Oct. 4, 2019 in corresponding U.S. Appl. No. 16/130,162.

German Office Action for German Application No. 112017000819.0, dated Aug. 19, 2020, with English translation.

* cited by examiner

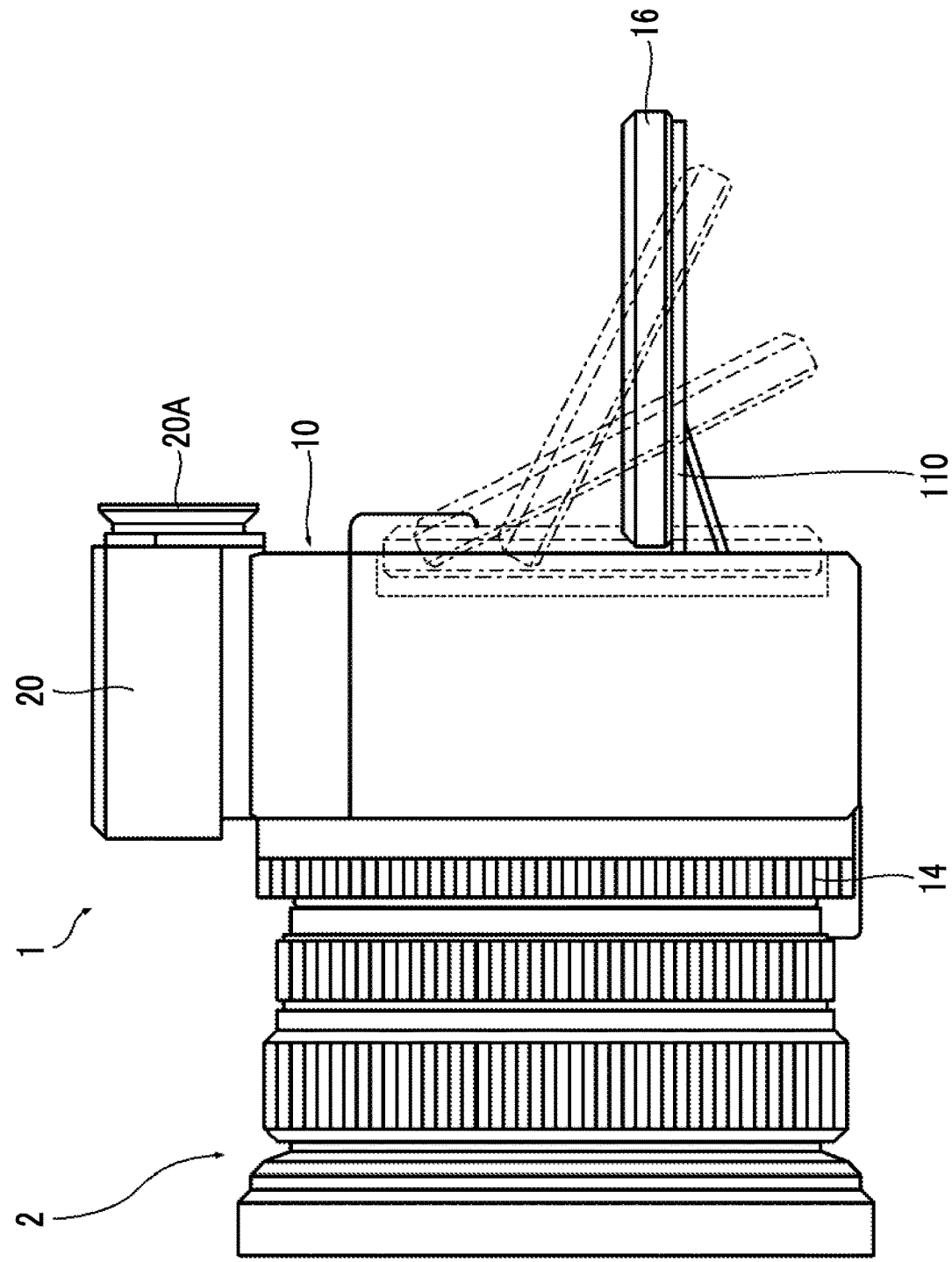

CAMERA

CROSS-REFERENCE TO RELATED APPLICATIONS

The present application is a Continuation of U.S. patent application Ser. No. 16/785,135 filed on Feb. 7, 2020, which is a Continuation of U.S. patent application Ser. No. 16/130,162 filed on Sep. 13, 2018, which is a Continuation of PCT International Application No. PCT/JP2017/009576 filed on Mar. 9, 2017, which claims priority under 35 U.S.C § 119(a) to Japanese Patent Application No. 2016-051285 filed on Mar. 15, 2016. Each of the above applications is hereby expressly incorporated by reference, in their entirety, into the present application.

BACKGROUND OF THE INVENTION

1. Field of the Invention

The present invention relates to a camera, and more particularly, to a camera that includes a rotary dial on a camera body.

2. Description of the Related Art

In the past, most high-end cameras, such lens-interchangeable cameras, have employed an operation system that includes a rotary dial as a main component. Since the operation system, which includes a rotary dial as a main component, can be intuitively operated and the set state of the operation system can also be confirmed at a glance, the operation system is employed in many cameras even today.

However, since a user operates the rotary dial while looking at a dial plate, there is a drawback that it is difficult to operate the rotary dial in a dark place.

A structure that includes an illumination lamp built in a dial having a lock function and turns on the illumination lamp built in the dial in conjunction with an operation for releasing the lock of the dial is proposed in JP2015-154323A. Further, a structure that displays the image picture of the dial on a monitor for image display, which is provided on the back of a camera body, in conjunction with an operation for releasing the lock of the dial is proposed in JP2015-154323A.

Furthermore, a structure that displays the image picture of a dial on a monitor for image display, which is provided on the back of a camera body, in conjunction with the operation of an illumination button is proposed in JP2003-110882A.

Moreover, a structure that detects a touch with a dial and displays the image picture of the dial on a monitor for image display provided on the back of a camera body is proposed in WO2014/002659A.

SUMMARY OF THE INVENTION

However, in a case in which the illumination lamp is built in the dial as in JP2015-154323A, there are drawbacks that the internal structure of the dial is complicated and costs are increased.

Further, in a case in which the image picture of the dial is displayed on the monitor for image display in conjunction with an operation for releasing the lock of the dial as in JP2015-154323A, the image picture of the dial is displayed on the monitor for image display even in an environment where the dial plate can be visually recognized. For this reason, there is a problem that operability rather deteriorates.

The same problem as the above-mentioned problem occurs even in a case in which a touch with a dial is detected and the image picture of the dial is displayed on the monitor for image display provided on the back of the camera body as in WO2014/002659A.

Further, there is a drawback that an intuitive operational feeling is damaged in the structure that displays the image picture of the dial on the monitor for image display in conjunction with the operation of the illumination button as in JP2003-110882A.

The invention has been made in consideration of the above-mentioned circumstances, and an object of the invention is to provide a camera of which operability is good regardless of the brightness of the surrounding environment.

Means for achieving the above-mentioned object are as follows.

(1) A camera comprising:
a rotary dial on which a plurality of selectable items are displayed in a rotation direction and which is used to fit an item to be set to an indicator to select the item;
a brightness detection unit that detects a brightness of a surrounding environment;
a display unit; and
a display control unit that controls a display on the display unit,
wherein the display control unit displays contents of settings of the camera on the display unit and displays an image, which represents a set state of the dial, on the display unit in a case in which the brightness detected by the brightness detection unit is equal to or lower than a prescribed brightness.

According to this aspect, the contents of settings of the camera are displayed on the display unit in a situation in which the surrounding environment is bright. On the other hand, the image representing the set state of the dial is displayed on the display unit in a case in which the surrounding environment is dark. Accordingly, the dial can be appropriately operated even in a situation in which the surrounding environment is dark. Further, since the image representing the set state of the dial is displayed on the display unit only in a situation in which the surrounding environment is dark, there is no damage to the operability of the camera in a situation in which the surrounding environment is bright.

(2) The camera according to (1),
wherein the display control unit changes the image, which represents the set state of the dial, according to a rotational operation of the dial.

According to this aspect, a display on the display unit is changed according to the rotational operation of the dial. That is, the image representing the set state of the dial is changed according to the rotational operation of the dial. Accordingly, since a display, which is in conjunction with the operation of the dial, is made, it is possible to easily select a desired item.

(3) The camera according to (1), further comprising:
a touch detection unit that detects a touch with the dial,
wherein the display control unit displays the image, which represents the set state of the dial, on the display unit in a case in which the brightness detected by the brightness detection unit is equal to or lower than the prescribed brightness and a touch with the dial is detected by the touch detection unit.

According to this aspect, the image representing the set state of the dial is not displayed in a case in which the surrounding environment is merely darkened, and the image representing the set state of the dial is displayed on the display unit in a case in which a touch with the dial is detected. Accordingly, since the image representing the set state of the dial can be displayed only in a case in which the image representing the set state of the dial really needs to be displayed on the display unit, it is possible to further improve the operability of the entire camera.

(4) The camera according to (1), wherein the display control unit displays the image, which represents the set state of the dial, on the display unit in a case in which the brightness detected by the brightness detection unit is equal to or lower than the prescribed brightness and the dial is rotationally operated, and changes the image, which represents the set state of the dial, according to a rotational operation of the dial.

According to this aspect, the image representing the set state of the dial is not displayed in a case in which the surrounding environment is merely darkened, and the image representing the set state of the dial is displayed on the display unit in a case in which the dial is rotationally operated. Accordingly, since the image representing the set state of the dial can be displayed only in a case in which the image representing the set state of the dial really needs to be displayed on the display unit, it is possible to further improve the operability of the entire camera. Further, since the displayed image is changed according to the rotational operation of the dial, it is possible to easily select a desired item.

(5) The camera according to any one of (1) to (4), wherein the display control unit displays an image picture of the dial on the display unit as the image that represents the set state of the dial.

According to this aspect, the image picture of the dial is displayed on the display unit as the image representing the set state of the dial. Accordingly, since a relationship between a display on the display unit and the dial becomes clear, an intuitive operation can be performed.

(6) The camera according to (5), wherein the display control unit displays an image picture of a part of the dial, which is cut out, on the display unit in a case in which the display control unit displays the image picture of the dial on the display unit as the image that represents the set state of the dial.

According to this aspect, the image picture of a part of the dial, which is cut out, is displayed as the image representing the set state of the dial. Accordingly, since it is possible to ensure good visibility even in a case in which the size of the display unit is small, it is possible to easily select a desired item.

(7) The camera according to any one of (1) to (6), wherein the display control unit reduces and displays contents of settings of the camera on the display unit in a case in which the display control unit displays the image, which represents the set state of the dial, on the display unit.

According to this aspect, in a case in which the image representing the set state of the dial is to be displayed, the image representing the set state of the dial and the contents of settings of the camera are displayed on the display unit. In this case, the contents of settings of the camera are made to be smaller than those at a normal time and are displayed. The normal time means a time when the image representing the set state of the dial is not displayed, and is a time when the surrounding environment is bright. Since the contents of settings of the camera are also displayed, the contents of settings of the camera can be confirmed. Accordingly, the operability of the camera can be further improved. Further, since the contents of settings of the camera are reduced in size and are displayed, the image representing the set state of the dial can be made to be easy to see.

(8) The camera according to any one of (1) to (7), wherein the dial is disposed on a top surface of a camera body.

According to this aspect, the dial is provided on the top surface of the camera body. The settings of the dial can be easily confirmed.

(9) The camera according to (8), wherein the display unit is disposed on the top surface of the camera body.

According to this aspect, the dial and the display unit are provided on the top surface of the camera body. Accordingly, since a relationship between the dial and a display on the display unit can be made clearer in a case in which the image representing the set state of the dial is displayed on the display unit, operability can be further improved. Further, since the dial and the display unit are disposed on the same surface, it is possible to easily operate the dial while looking at the display unit. To allow a more intuitive operation to be performed, it is preferable that the display unit and the dial are disposed close to each other.

(10) The camera according to any one of (1) to (9), wherein the display unit is formed of a reflective liquid crystal display provided with an illumination lamp.

According to this aspect, the display unit is formed of a reflective liquid crystal display provided with an illumination lamp. Accordingly, good visibility for a display on the display unit can be ensured even in an environment where surroundings are bright.

(11) The camera according to any one of (1) to (9), wherein the display unit is formed of an electronic paper provided with an illumination lamp.

According to this aspect, the display unit is formed of an electronic paper provided with an illumination lamp. Accordingly, good visibility for a display on the display unit can be ensured even in an environment where surroundings are bright. Further, a display on the display unit can be confirmed even in a case in which the power supply of the camera is turned off

(12) The camera according to any one of (1) to (9), wherein the display unit is formed of a memory liquid crystal display provided with an illumination lamp.

According to this aspect, the display unit is formed of a memory liquid crystal display provided with an illumination lamp. Accordingly, good visibility for a display on the display unit can be ensured even in an environment where surroundings are bright. Further, a display on the display unit can be confirmed even in a case in which the power supply of the camera is turned off

(13) The camera according to any one of (10) to (12), further comprising:

an illumination lamp-control unit that controls the illumination lamp, wherein the illumination lamp-control unit turns on the illumination lamp in a case in which the brightness detected by the brightness detection unit is equal to or lower than the prescribed brightness.

According to this aspect, the illumination lamp is turned on in a case in which the surrounding environment is darkened. Accordingly, good visibility can be ensured even in an environment where surroundings are dark.

(14) The camera according to any one of (1) to (13), wherein the brightness detection unit detects the brightness of the surrounding environment on the basis of imaging light.

According to this aspect, the brightness of the surrounding environment is detected on the basis of the imaging light. The imaging light is light that is incident on the camera for the purpose of imaging and is light that is incident on the camera through the lens. Since the brightness of the surrounding environment is detected on the basis of the imaging light, the brightness of the surrounding environment can be easily detected. Particularly, in a case in which the dial is provided on the top surface of the camera body, the brightness of the top surface can be appropriately detected since the brightness of the surrounding environment is detected on the basis of the imaging light. That is, since the brightness of the top surface is substantially the same as the brightness of the imaging light, the brightness of the top surface can be detected in a case in which the brightness of the surrounding environment is detected on the basis of the imaging light. Accordingly, it is possible to appropriately control a display on the display unit according to the brightness of the surrounding environment.

(15) The camera according to any one of (1) to (14), wherein at least one of a shutter speed, a stop value, or sensitivity, which is set, is included in the contents of settings of the camera displayed on the display unit.

According to this aspect, at least one of a shutter speed, a stop value, or sensitivity is displayed as the contents of settings of the camera.

According to the invention, it is possible to provide a camera of which operability is good regardless of the brightness of the surrounding environment.

BRIEF DESCRIPTION OF THE DRAWINGS

FIG. 24 is a left side view showing an example of a digital camera of which a main display is formed of a variable-angle display.

DESCRIPTION OF THE PREFERRED EMBODIMENTS

Preferred embodiments of the invention will be described in detail below with reference to accompanying drawings.

First Embodiment

<<Appearance>>

FIGS. 1, 2, 3, and 4 are a front view, a back view, a plan view, and a left side view showing the appearance of a digital camera, respectively.

In this specification, a direction parallel to an optical axis L is referred to as a front-rear direction and a subject side is referred to as a front side. Further, on a plane orthogonal to the optical axis L, a direction parallel to a long side of an image sensor 50 (an x direction in FIG. 1) is referred to as a lateral direction or a left-right direction and a direction parallel to a short side of the image sensor 50 (a y direction in FIG. 1) is referred to as a vertical direction or an up-down direction.

A digital camera 1 of this embodiment is a lens-interchangeable digital camera, and is a non-reflex digital camera. The lens-interchangeable digital camera is a digital camera of which a lens can be interchanged. The non-reflex digital camera is a digital camera not including a reflex mirror for guiding light, which is incident from a lens, to an optical viewfinder. The non-reflex digital camera is also referred to as a mirrorless digital camera.

Figure 5:
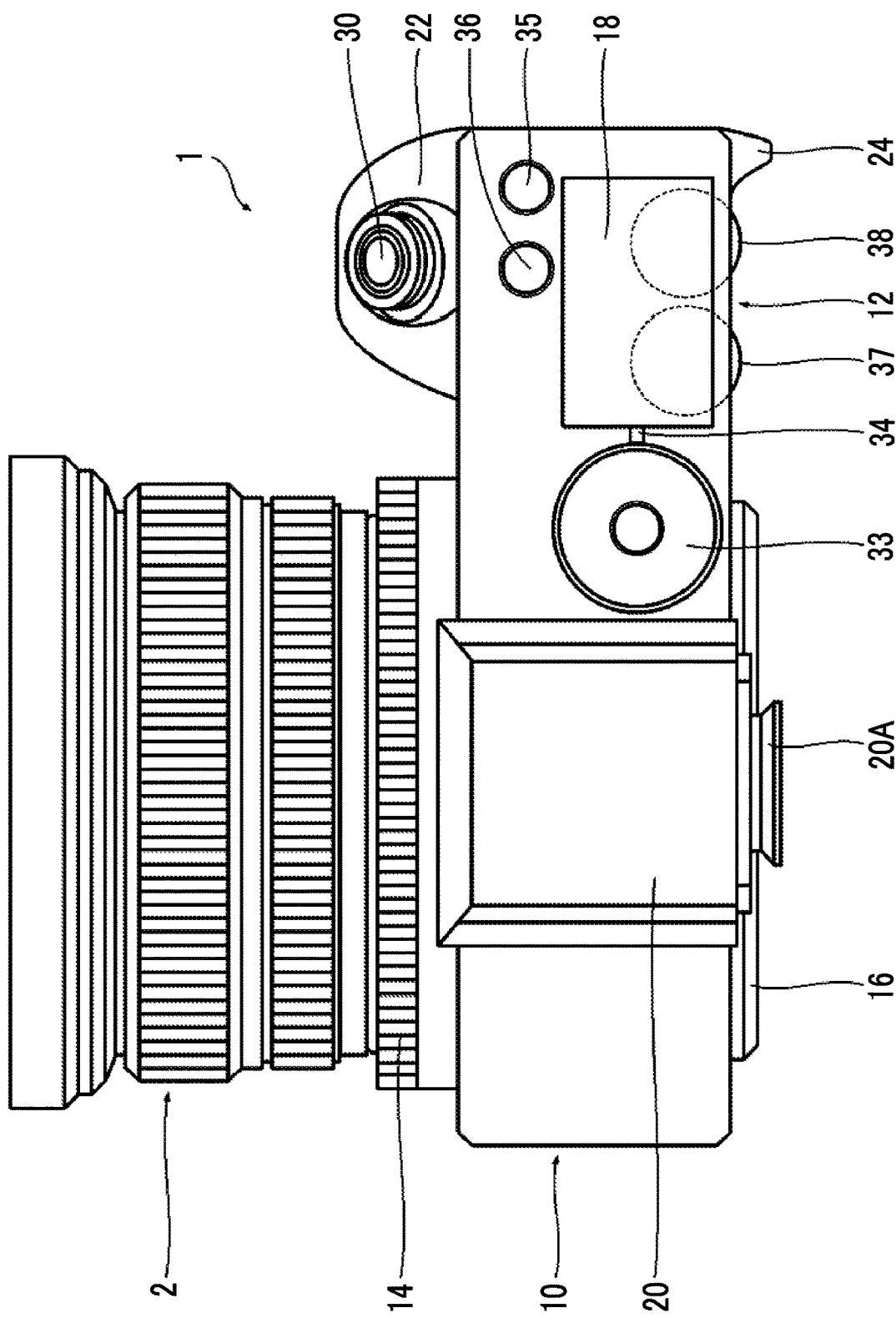
FIG. 5 is a plan view of the digital camera on which a lens is mounted.

FIG. 5 is a plan view of the digital camera on which a lens is mounted. As shown in FIG. 5, the digital camera 1 of this embodiment is used in a state in which a lens 2 is mounted on a camera body 10. The camera body 10 is provided with a lens mount 14, a main display 16, a sub-display 18, an electronic view finder 20, various operation buttons, and the like.

<Camera Body>

The camera body 10 has the shape of a rectangular box that is thin in the front-rear direction. One (left in FIG. 1) end portion of the camera body 10 is formed as a grip portion 12. A grip 22 is provided on the front side of the grip portion 12, and a thumb rest 24 is provided on the back side of the grip portion 12.

<Lens Mount>

Figure 1:
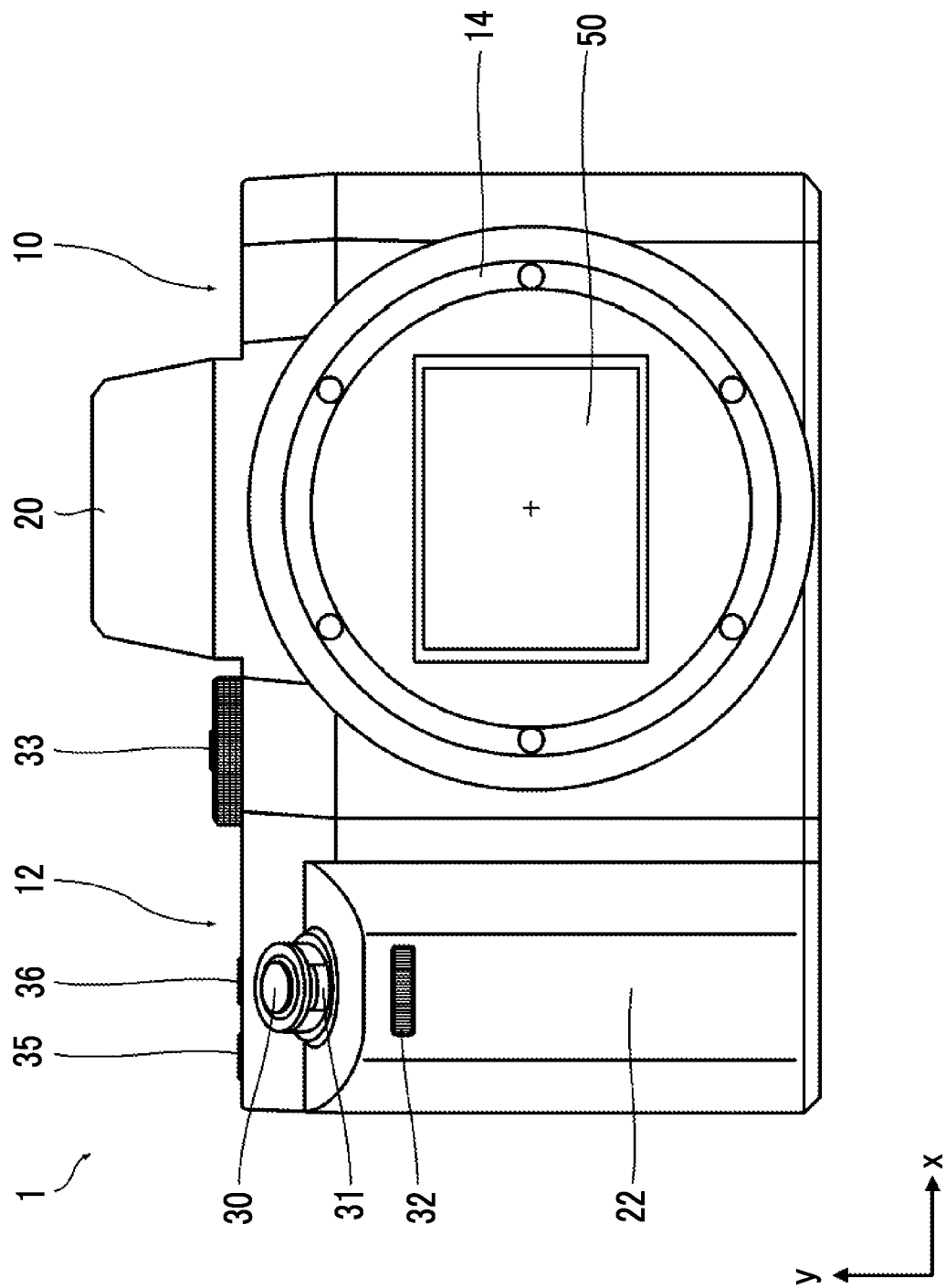
FIG. 1 is a front view showing the appearance of a digital camera.

The lens mount 14 is a mounting portion for the lens 2. As shown in FIG. 1, the lens mount 14 is provided on the front of the camera body 10.

<Main Display>

Figure 2:
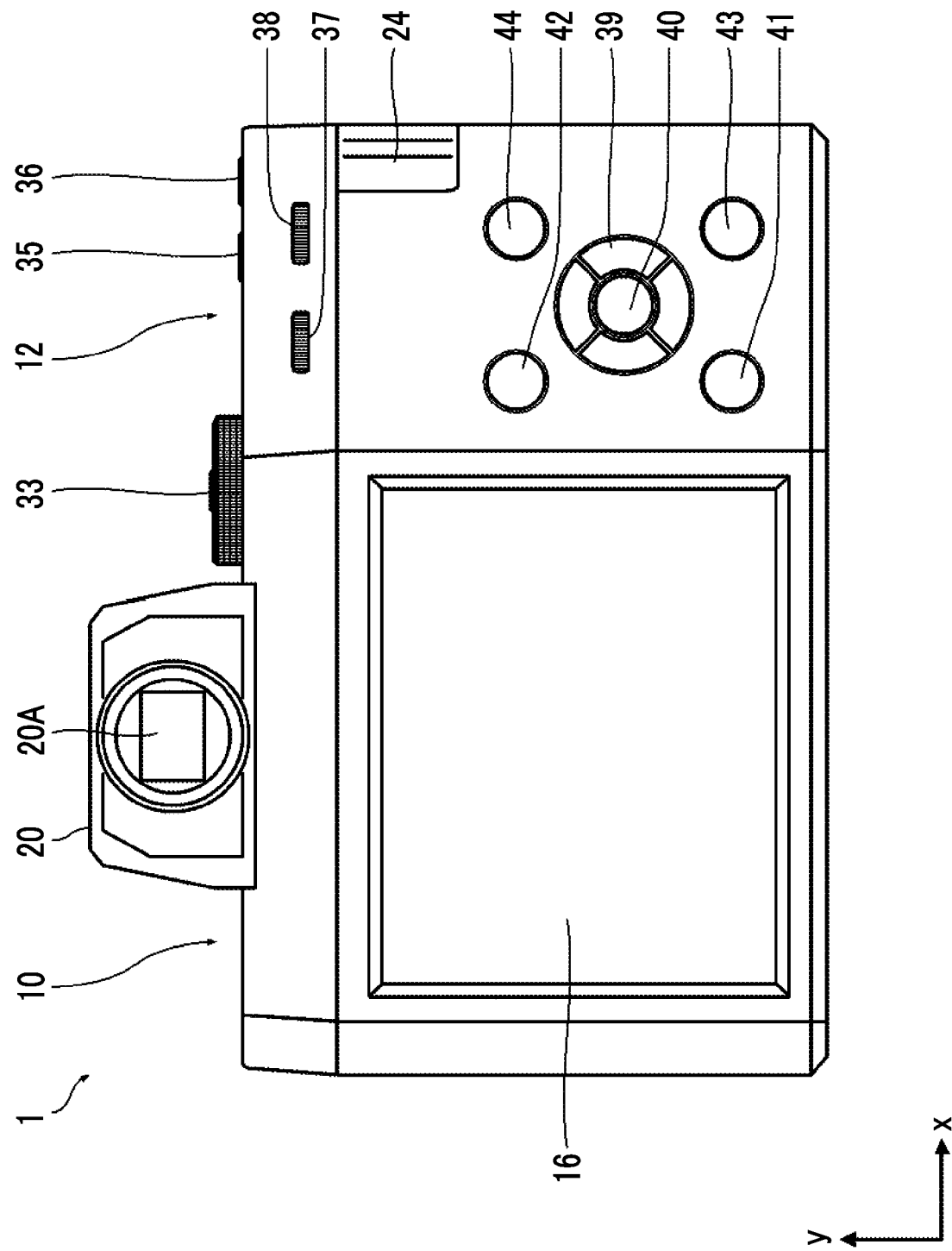
FIG. 2 is a back view showing the appearance of the digital camera.

The main display 16 is a large-screen display for displaying an image and the like. The main display 16 is used to display a taken image, to display a live view image, or to mainly display an image. Further, the main display 16 is used as a setting screen that is used to perform various settings. That is, the main display 16 is also used as a graphical user interface (GUI). As shown in FIG. 2, the main display 16 is provided on the back of the camera body 10. The main display 16 is formed of, for example, a color liquid crystal display (LCD).

<Sub-Display>

Figure 3:
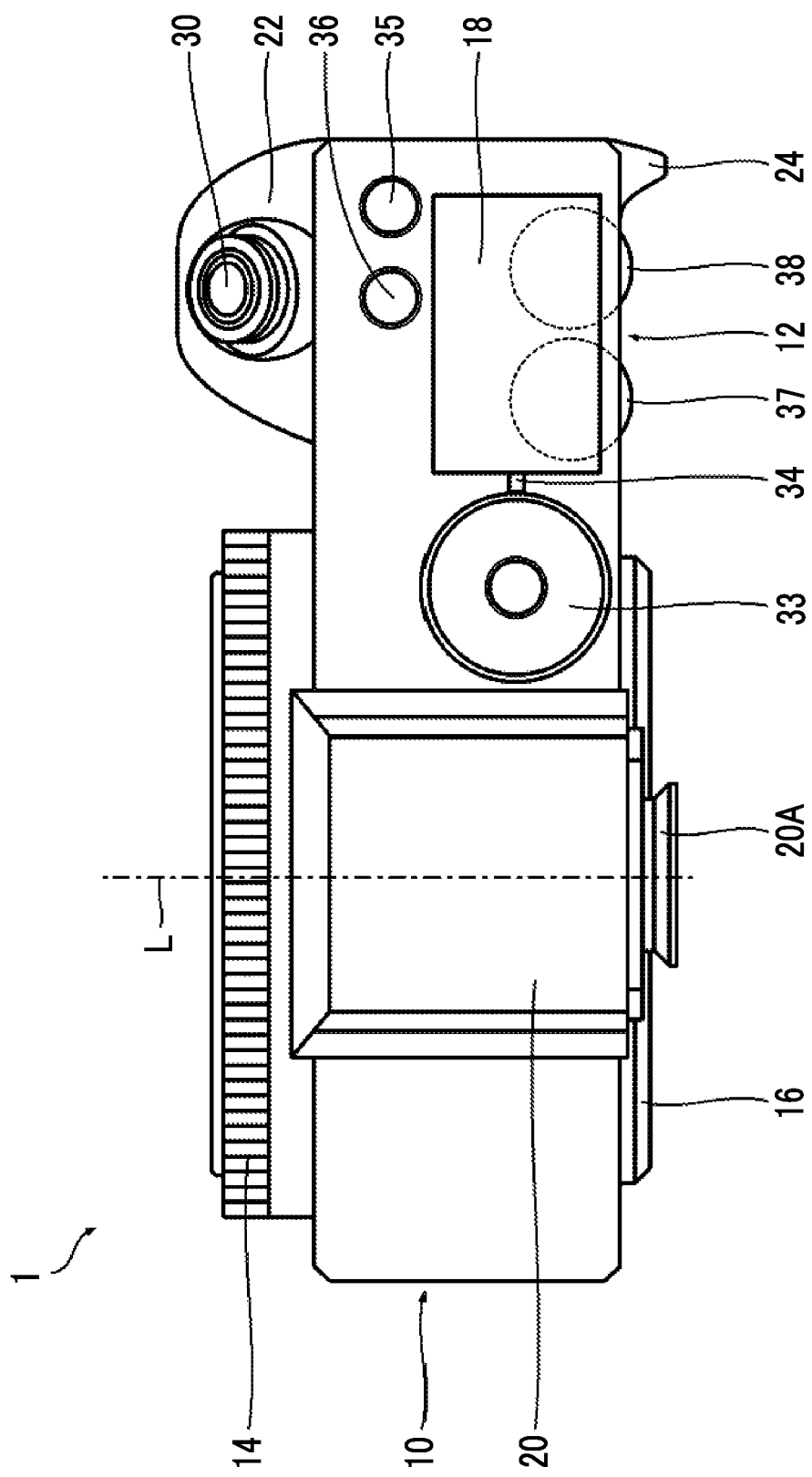
FIG. 3 is a plan view showing the appearance of the digital camera.
Figure 4:
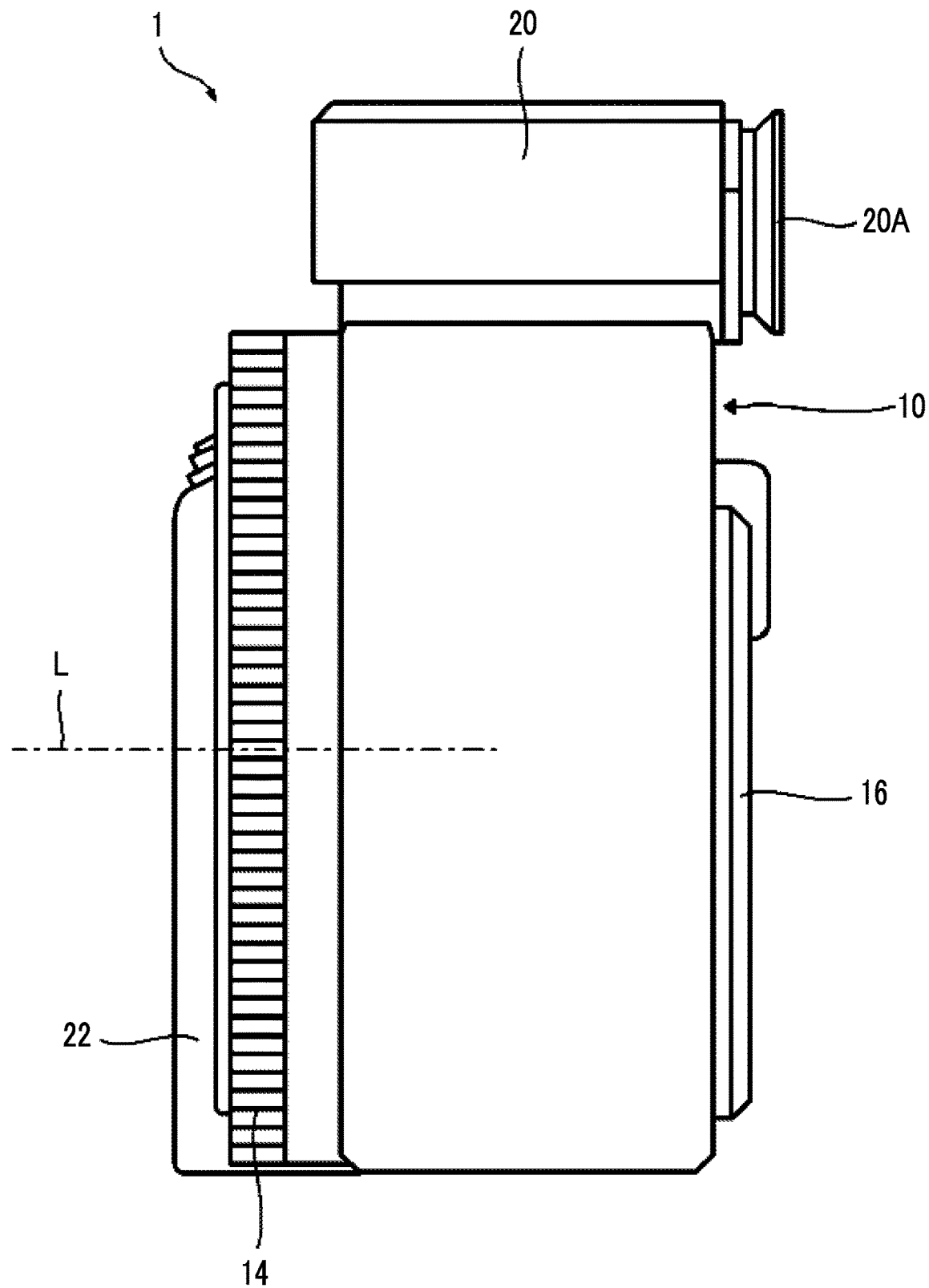
FIG. 4 is a left side view showing the appearance of the digital camera.

The sub-display 18 is a small-screen display for displaying the contents of settings of the camera, and the like. As shown in FIG. 3, the sub-display 18 is provided on the top surface of the camera body 10. The sub-display 18 is formed of, for example, a reflective liquid crystal display (reflective LCD) provided with an illumination lamp.

<Electronic View Finder>

The electronic view finder 20 is provided on the top surface of the camera body 10. As shown in FIG. 2, an eyepiece portion 20A of the electronic view finder 20 is disposed on the back of the camera body 10.

<Operation Buttons>

The camera body 10 is provided with a shutter button 30, a power supply lever 31, a front command dial 32, a shutter speed dial 33, an illumination button 35, a function button 36, a first rear command dial 37, a second rear command dial 38, selector buttons 39, a menu button 40, a cancel button 41, a play button 42, a delete button 43, an imaging condition-setting button 44, and the like as the operation buttons.

The shutter button 30 is a member that is used to instruct the camera to perform imaging. The shutter button 30 is formed of a so-called two-stage switch that has a half-pressed stage and a fully-pressed stage. In a case in which the shutter button 30 is half pressed, the metering of light, the measurement of a distance, or the like is performed. In a case in which the shutter button 30 is fully pressed, main imaging is performed. The shutter button 30 is provided at the top portion of the grip 22.

The power supply lever 31 is a member that is used to switch on and off a power supply. The power supply lever 31 is disposed coaxially with the shutter button 30, and is rotationally operated between an ON position and an OFF position.

The front command dial 32 is a member to be rotationally operated, and various functions are assigned to the front command dial 32 according to the set state of the digital camera 1. The front command dial 32 is adapted to be capable of endlessly rotating and being operated by pressing. An operation for pressing the front command dial is an operation for pressing the front command dial in a direction orthogonal to a rotation axis. Further, the front command dial 32 includes a click mechanism, and generates a click feeling at regular angular intervals in a case in which the front command dial 32 is rotationally operated. The front command dial 32 is provided in the grip 22, and is disposed so that a portion of the front command dial 32 is exposed to the outer surface of the grip 22. A user turns the portion of the front command dial 32, which is exposed to the outer surface of the grip 22, with a finger to rotationally operate the front command dial 32. Further, a user presses the portion of the front command dial 32, which is exposed to the outer surface of the grip 22, to the inside of the grip with a finger to press the front command dial 32.

The shutter speed dial 33 is a member that is used to set a shutter speed. As shown in FIG. 2, the shutter speed dial 33 is provided on the top surface of the camera body 10. The shutter speed dial 33 is disposed adjacent to the sub-display 18.

Figure 6:
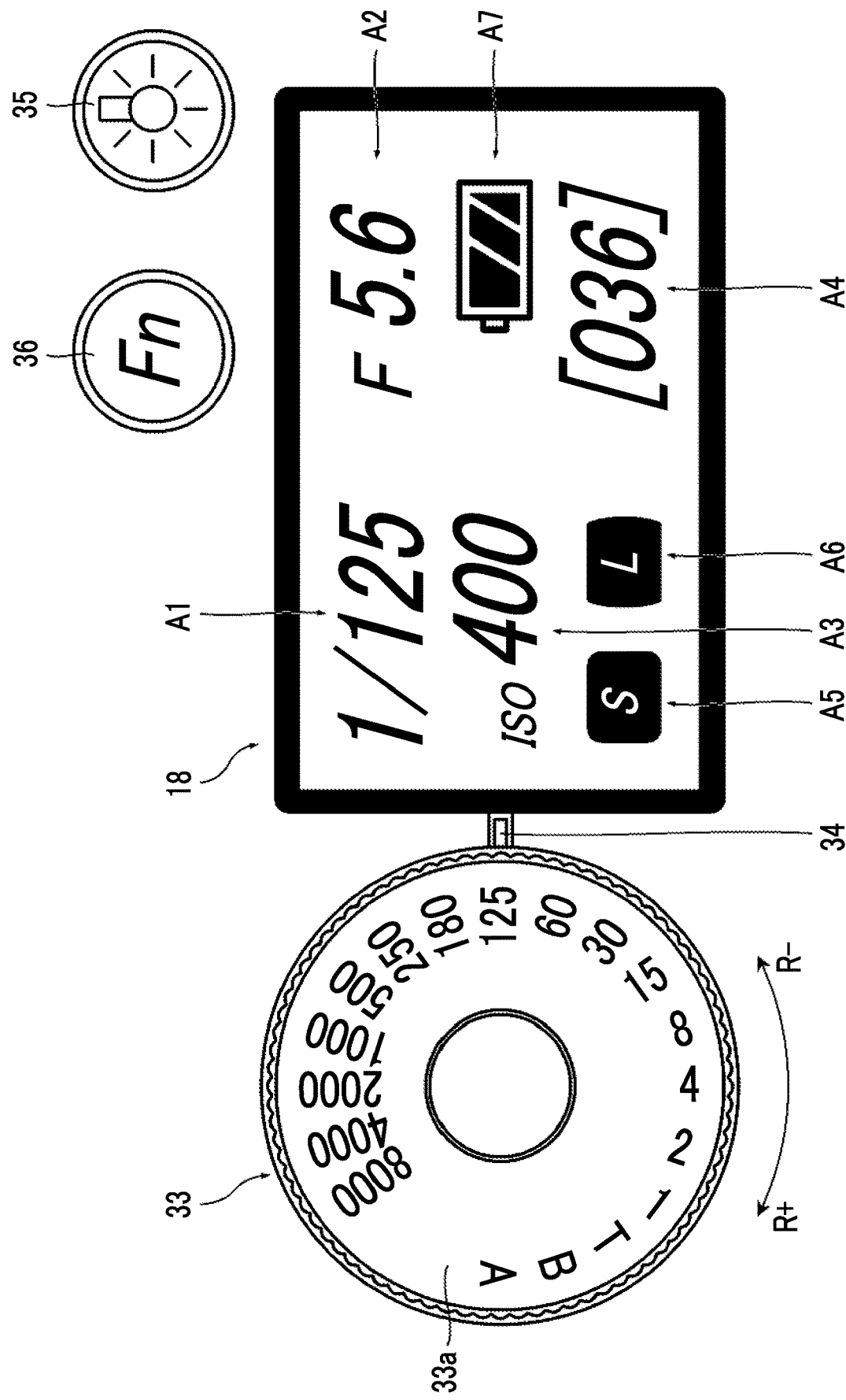
FIG. 6 is an enlarged plan view of a portion near a shutter speed dial.

FIG. 6 is an enlarged plan view of a portion near the shutter speed dial.

The shutter speed dial 33 is formed of a rotary dial. The shutter speed dial 33 has the shape of a disc, and is adapted to be capable of endlessly rotating about an axis.

The shutter speed dial 33 includes a dial plate 33a on the top surface (upper surface) thereof. A plurality of selectable values of a shutter speed is displayed on the dial plate 33a as selectable items. The selectable values of a shutter speed are displayed at regular intervals in a rotation direction. In the digital camera 1 of this embodiment, 1, ½, ¼, ⅛, 1/15, 1/30, 1/60, 1/125, 1/180, 1/250, 1/500, 1/1000, 1/2000, 1/4000, and 1/8000 (sec.) are prepared as the selectable values of a shutter speed. Marks of the values of a shutter speed displayed on the dial plate are shown as reciprocals. That is, 1, ½, ¼, ⅛, 1/15, 1/30, 1/60, 1/125, 1/180, 1/250, 1/500, 1/1000, 1/2000, 1/4000, and 1/8000 (sec.) are displayed as 1, 2, 4, 6, 15, 30, 60, 125, 180, 250, 500, 1000, 2000, 4000, and 8000, respectively. Accordingly, in a case in which, for example, "60" shown on the dial plate is selected, a shutter speed is set to 1/60 sec. Further, a time-imaging mode and a bulb-imaging mode are prepared as items to be capable of being selected by the shutter speed dial 33. Marks of the respective items displayed on the dial plate are T and B. The time-imaging mode is set in a case in which "T" displayed on the dial plate is selected, and the bulb-imaging mode is set in a case in which "B" is selected. The time-imaging mode is a mode in which exposure is performed only for a time optionally designated by a user. The bulb-imaging mode is a mode in which exposure is performed only while the shutter button 30 is pressed. Both the time-imaging mode and the bulb-imaging mode are selected in a case in which exposure needs to be performed for a time longer than 1 second.

An indicator 34, which is used to select a shutter speed, is provided near the shutter speed dial 33. In the digital camera 1 of this embodiment, the indicator 34 is provided between the shutter speed dial 33 and the sub-display 18 (the indicator 34 is provided at a position corresponding to three o'clock in a case in which the indicator 34 is seen from the shutter speed dial 33). A user fits the mark of a shutter speed, which is desired to be selected, to the position of the indicator 34 to select the shutter speed. For example, in a case in which 1/60 sec is to be selected as a shutter speed, a user rotates the shutter speed dial 33 to fit "60" of the marks of the dial plate 33a to the indicator 34.

The shutter speed dial 33 includes a click mechanism, and generates click feelings so as to correspond to the pitch of the marks of the dial plate 33a in a case in which the shutter speed dial 33 is rotationally operated. A position where the shutter speed dial 33 is to be click-stopped coincides with the position of the indicator 34. Accordingly, in a case in which the shutter speed dial 33 is rotated in a normal direction (in FIG. 6, a clockwise direction indicated by an arrow R+), the marks are moved up one by one by each click. Further, in a case in which the shutter speed dial 33 is rotated in a reverse direction (in FIG. 6, a counterclockwise direction indicated by an arrow R−), the marks are moved down one by one by each click.

The illumination button 35 is a member that is used to switch on and off the illumination lamp of the sub-display 18. Whenever the illumination button 35 is pressed, the illumination lamp of the sub-display 18 is switched to be turned on and off. The illumination button 35 is provided on the top surface of the camera body 10.

Various functions are assigned to the function button 36 according to the set state of the digital camera 1. The function button 36 is provided on the top surface of the camera body 10. The function button 36 and the illumination button 35 are arranged in parallel and are disposed near the sub-display 18.

The first rear command dial 37 is a member to be rotationally operated, and various functions are assigned to the first rear command dial 37 according to the set state of the digital camera 1. The first rear command dial 37 is adapted to be capable of endlessly rotating and being operated by pressing. Further, the first rear command dial 37 includes a click mechanism, and generates a click feeling at regular angular intervals in a case in which the first rear command dial 37 is rotationally operated. The first rear command dial 37 is provided on the back of the camera body 10, and is disposed so that a portion of the first rear command dial 37 is exposed to the back of the camera body 10.

The second rear command dial 38 is a member to be rotationally operated, and various functions are assigned to the second rear command dial 38 according to the set state of the digital camera 1. The second rear command dial 38 is adapted to be capable of endlessly rotating and being operated by pressing. Further, the second rear command dial 38 includes a click mechanism, and generates a click feeling at regular angular intervals in a case in which the second rear command dial 38 is rotationally operated. The second rear command dial 38 is provided on the back of the camera body 10, and is disposed so that a portion of the second rear command dial 38 is exposed to the back of the camera body 10.

The first and second rear command dials 37 and 38 are arranged in parallel on the back of the camera body 10, and are disposed to be capable of rotationally operating in a horizontal direction. Particularly, in the digital camera 1 of this embodiment, the first and second rear command dials 37 and 38 are arranged in parallel near the thumb rest 24 so as to be capable of being operated by a thumb of a hand that grips the camera body 10. Further, in the digital camera 1 of this embodiment, each of the first and second rear command dials 37 and 38 is disposed so that a portion of each of the first and second rear command dials 37 and 38 overlaps the sub-display 18. That is, the first and second rear command dials 37 and 38 are disposed so as to be hidden under the sub-display 18.

The selector buttons 39 are buttons that can be used to give instructions in four directions, that is, to the upper side, the lower side, the left side, and the right side, and are formed of four buttons that are arranged on the same circle. Functions corresponding to the set state of the digital camera 1 are assigned to the buttons corresponding to the respective directions. The selector buttons 39 are provided on the back of the camera body 10.

The menu button 40 is a button that is used to call a menu screen. In a case in which the menu button 40 is pressed, a menu screen used to perform various settings is displayed on the main display 16. The menu button 40 also functions as a decision button (OK button), and is used for the decision of an item to be selected, and the like. The menu button 40 is provided on the back of the camera body 10.

The cancel button 41 is a button that is used to instruct the camera to cancel an operation. In a case in which the cancel button 41 is pressed, an instruction to cancel an item to be selected, or the like is input. The cancel button 41 is provided on the back of the camera body 10.

The play button 42 is a button that is used to switch a mode to a playback mode. In a case in which the play button 42 is pressed, the mode of the digital camera 1 is switched to a playback mode. In a case in which the playback mode is set, a taken image is read from a memory card and is played and displayed on the main display 16. The play button 42 is provided on the back of the camera body 10.

The delete button 43 is a button that is used to instruct the camera to delete the taken image. In a case in which the delete button 43 is pressed during the playback of the image, the image, which is being played, is deleted from the memory card. The delete button 43 is provided on the back of the camera body 10.

The imaging condition-setting button 44 is a button that is used to call a setting screen for imaging conditions. In a case in which the imaging condition-setting button 44 is pressed, the setting screen for imaging conditions is displayed on the main display 16. The imaging condition-setting button 44 is provided on the back of the camera body 10.

<<Control System>>

Figure 7:
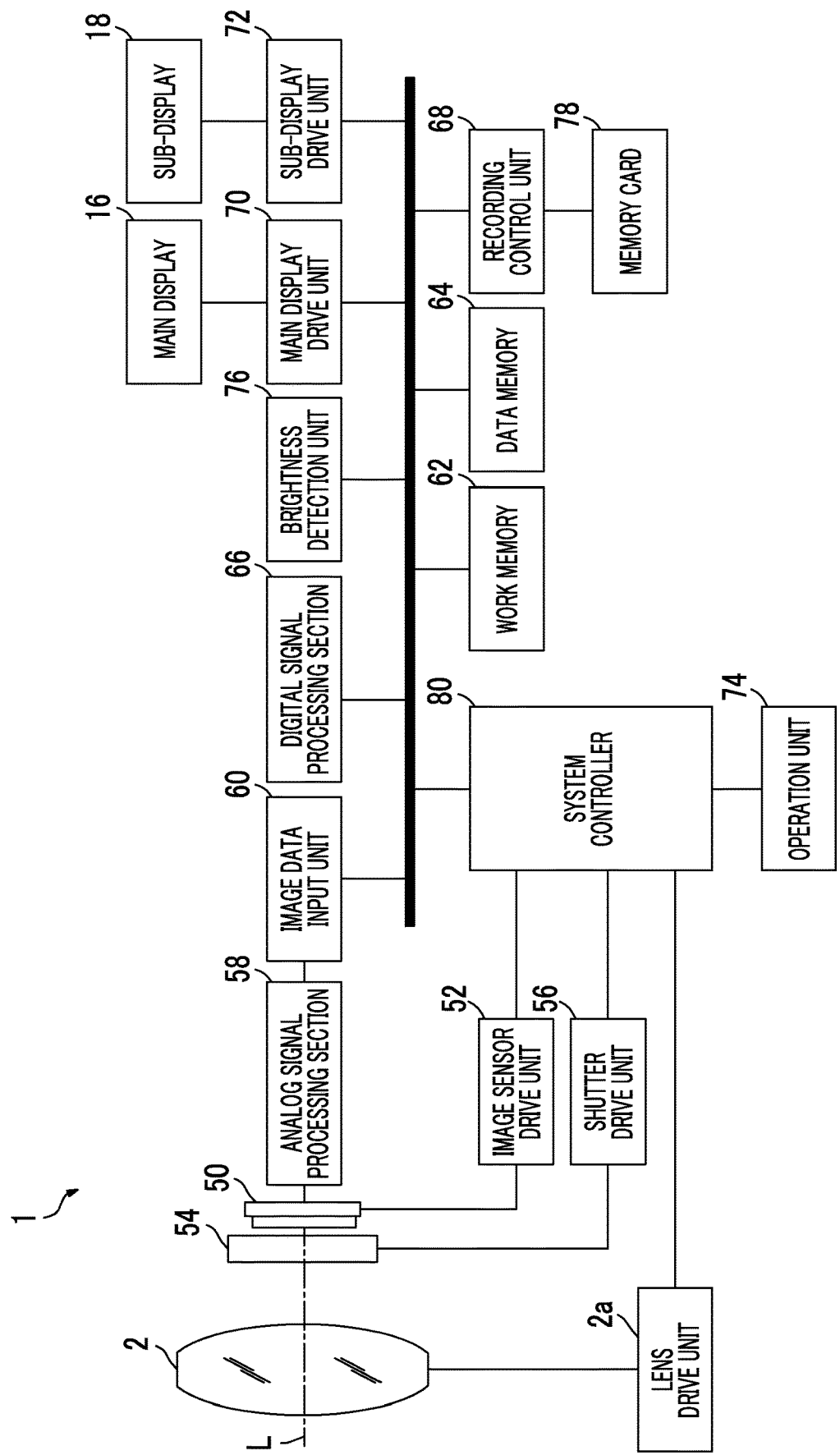
FIG. 7 is a block diagram showing the schematic configuration of a control system of the digital camera.

FIG. 7 is a block diagram showing the schematic configuration of a control system of the digital camera.

The digital camera 1 includes an image sensor 50, an image sensor drive unit 52, a shutter 54, a shutter drive unit 56, an analog signal processing section 58, an image data input unit 60, a work memory 62, a data memory 64, a digital signal processing section 66, a recording control unit 68, a main display drive unit 70, a sub-display drive unit 72, an operation unit 74, a brightness detection unit 76, a system controller 80, and the like.

The image sensor 50 converts an optical image of a subject, which is formed through the lens 2, into electrical signals and outputs the electrical signals. A publicly known image sensor, such as a charged coupled device (CCD) image sensor or a complementary metal oxide semiconductor (CMOS) image sensor, is used as the image sensor 50.

The image sensor drive unit 52 drives the image sensor 50 according to a command output from the system controller 80.

The shutter 54 is formed of a square type focal-plane shutter, and is disposed directly in front of the image sensor 50.

The shutter drive unit 56 drives the shutter 54 according to a command output from the system controller 80.

The analog signal processing section 58 receives the signals output from the image sensor 50, and performs required signal processing, such as correlated double sampling processing and amplification processing. Further, the analog signal processing section 58 converts analog image signals, which have been subjected to required signal processing, into digital image signals and outputs the digital image signals.

The image data input unit 60 receives the digital image signals, which are output from the analog signal processing section 58, according to a command output from the system controller 80. Received image data corresponding to one sheet is stored in the work memory 62.

The work memory 62 is used as a memory for work. The data memory 64 is formed of a non-volatile memory, and various data required for control and the like are stored in the data memory 64.

The digital signal processing section 66 performs required signal processing, such as demosaicing processing, white balance correction, gamma correction, and outline correction, on the image data received in the work memory 62, and generates predetermined image data formed of brightness data (Y data) and color difference data (Cr and Cb data).

The recording control unit 68 has access to the memory card 78 and reads and writes data according to a command output from the system controller 80. Image data, which is obtained from imaging, is recorded in the memory card 78.

The main display drive unit 70 drives the main display 16 according to a command output from the system controller 80.

The sub-display drive unit 72 drives the sub-display 18 according to a command output from the system controller 80.

The operation unit 74 includes the shutter button 30, the power supply lever 31, the front command dial 32, the shutter speed dial 33, the illumination button 35, the function button 36, the first rear command dial 37, the second rear command dial 38, the selector buttons 39, the menu button 40, the cancel button 41, the play button 42, the delete button 43, and the like. The operation unit 74 outputs a signal, which corresponds to the operation of each operation member, to the system controller 80.

The brightness detection unit 76 detects the brightness of the surrounding environment. In the digital camera 1 of this embodiment, the brightness detection unit 76 detects the brightness of the surrounding environment on the basis of the imaging light. That is, the brightness detection unit 76 detects the brightness of the surrounding environment on the basis of the image data obtained from imaging. The brightness detection unit 76 acquires image data from the digital signal processing section 66, and detects the brightness of the surrounding environment on the basis of the acquired image data. Specifically, the brightness detection unit 76 calculates the brightness of the surrounding environment on the basis of brightness data.

The system controller 80 is a control unit that controls the operation of each unit of the digital camera 1. The system controller 80 is formed of a microcomputer. That is, the microcomputer functions as the system controller 80 by executing a predetermined control program, and functions as a control unit that controls the operation of each unit of the digital camera 1.

The system controller 80 also functions as a control unit for the lens 2. The system controller 80 controls the operation of the lens 2 through a lens drive unit 2a provided for the lens 2. The lens 2 includes a stop, a focus lens, and the like. The lens drive unit 2a includes a stop drive unit that drives the stop, a focus lens drive unit that drives the focus lens, and the like.

<<Display Control of Sub-Display>>

In the digital camera 1 of this embodiment, a display on the sub-display 18, which is a display unit, is switched on the basis of the brightness of the surrounding environment. That is, the contents of settings of the digital camera 1 are displayed on the sub-display 18 in a situation in which the surrounding environment is bright. On the other hand, an image representing the set state of the shutter speed dial 33 is displayed on the sub-display 18 in a case in which the surrounding environment is darkened.

<Case in which Surrounding Environment is Bright>

FIG. 6 shows an example of a display on the sub-display 18 in a case in which the surrounding environment is bright.

As shown in FIG. 6, the contents of the current settings of the digital camera 1 are displayed on the sub-display 18 in a case in which the surrounding environment is bright. This display is referred to as a normal display. In the digital camera 1 of this embodiment, pieces of information on a shutter speed A1, a stop value (F-Number) A2, ISO sensitivity A3 (ISO: International Organization for Standardization), the number A4 of times of imaging that can be performed, an imaging mode A5, an image size A6, and remaining battery power A7 are displayed as the contents of settings. The respective pieces of information are displayed at prescribed positions.

The actual set values of the shutter speed A1, the stop value A2, the ISO sensitivity A3, and the number A4 of times of imaging that can be performed are displayed as numerical values.

Further, icons corresponding to the contents of settings are displayed in regard to the imaging mode A5 and the image size A6. In the digital camera 1 of this embodiment, a program mode, a shutter speed priority mode, a stop priority mode, and a manual mode are prepared as an imaging mode and an icon corresponding to each mode is displayed at a display position for the imaging mode. Here, the program mode is a mode where a camera automatically determines a stop value and a shutter speed so that an exposure is appropriate. The shutter speed priority mode is a mode where a camera automatically determines a stop value so that an exposure is appropriate for a shutter speed selected by a user. The stop priority mode is a mode where a camera automatically determines a shutter speed so that an exposure is appropriate for a stop value selected by a user. The manual mode is a mode where a user determines a shutter speed and a stop value to take an image.

An icon corresponding to the remaining power of a battery is displayed in regard to the remaining battery power A7.

<Case in which Surrounding Environment is Dark>

Figure 8:
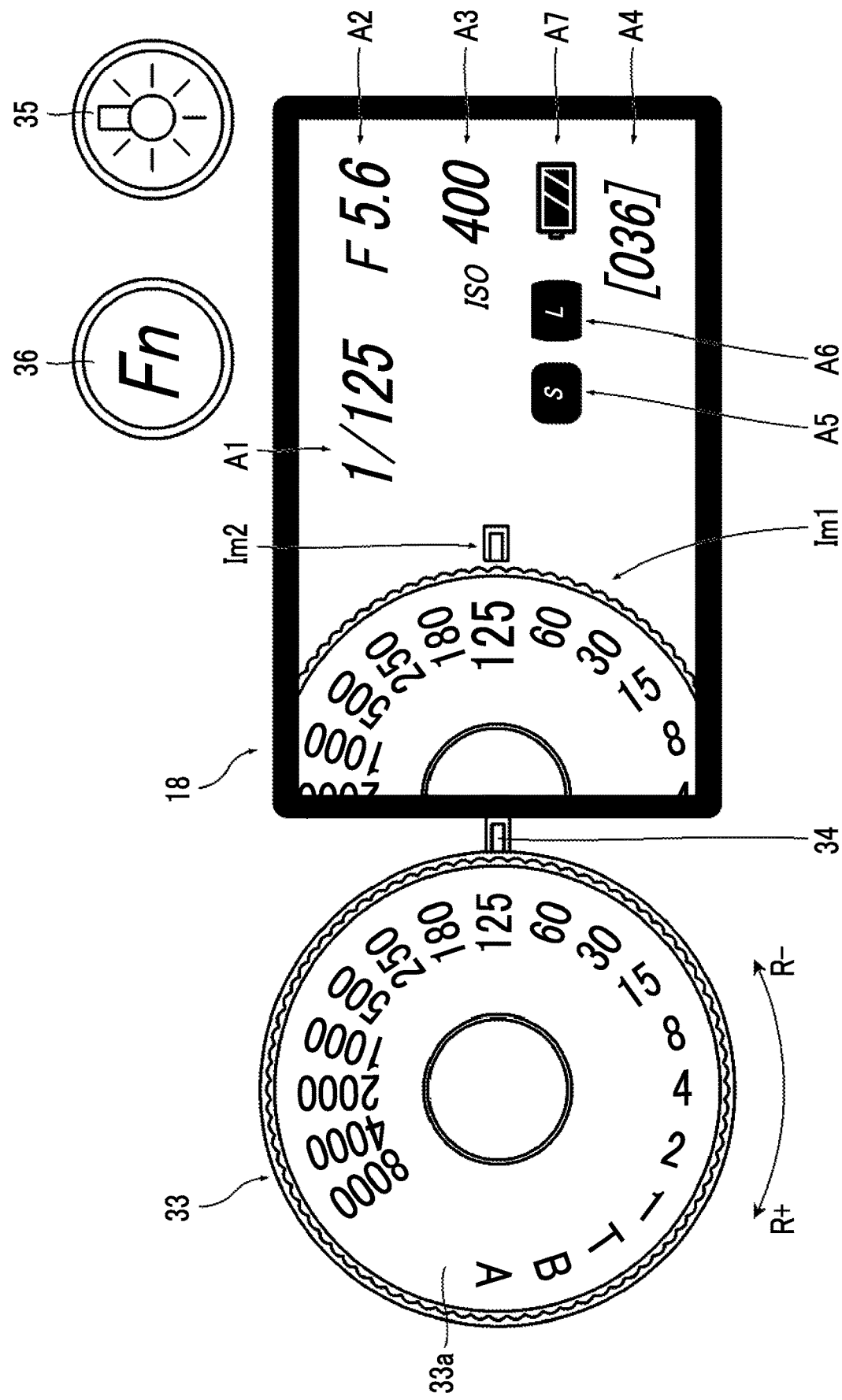
FIG. 8 is a diagram showing an example of a display on a sub-display in a case in which the surrounding environment is dark.

FIG. 8 is a diagram showing an example of a display on the sub-display in a case in which the surrounding environment is dark.

As shown in FIG. 8, the contents of the current settings of the digital camera 1 and the image representing the set state of the shutter speed dial 33 are displayed in a case in which the surrounding environment is dark. This display is referred to as a display for a dark place.

In the example shown in FIG. 8, an image picture Im1 of the shutter speed dial 33 and an image picture Im2 of the indicator 34 are displayed on the sub-display 18 as the image representing the set state of the shutter speed dial 33. Here, the image picture is an image that imitates the appearance of the shutter speed dial 33. Particularly, in the example shown in FIG. 8, the image of a part (a half in the example shown in FIG. 8) of the shutter speed dial 33, which is cut out, is displayed on the sub-display 18 as the image picture Im1. Further, in the example shown in FIG. 8, a shutter speed selected by the shutter speed dial 33 is enlarged and displayed so that the selected shutter speed becomes clear.

The contents of the current settings of the digital camera 1 are displayed in a margin area. In this case, as necessary, a layout is changed, is reduced in size, and is displayed. Further, items to be displayed are thinned out and displayed as necessary. For example, only a stop value and ISO sensitivity are displayed.

Since the image representing the set state of the shutter speed dial 33 is displayed on the sub-display 18 as described above in a case in which the surrounding environment is dark, the shutter speed dial 33 can be operated even in a situation in which the surrounding environment is dark.

<Display Control>

The display control of the sub-display 18 is performed by the system controller 80. The system controller 80 functions as a display control unit 80a for the sub-display 18 by executing a predetermined control program.

Figure 9:
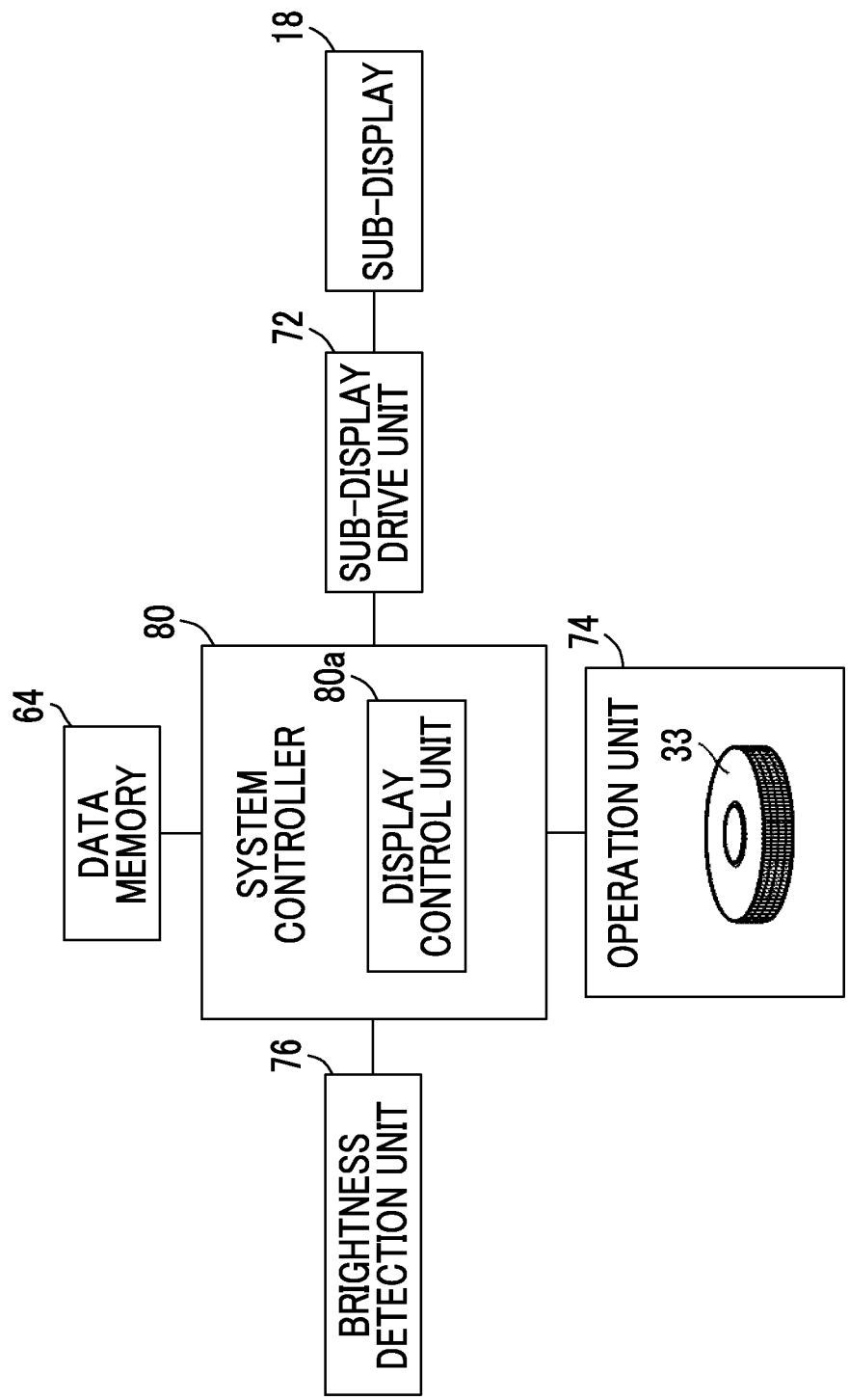
FIG. 9 is a functional block diagram of a display control unit.

FIG. 9 is a functional block diagram of the display control unit.

The display control unit 80a acquires the detection result of brightness from the brightness detection unit 76. Then, the display control unit 80a compares the acquired brightness and a threshold value. That is, the display control unit 80a determines whether or not the brightness of the surrounding environment is equal to or lower than a prescribed brightness. In a case in which the brightness exceeds the threshold value, the display control unit 80a determines that the surrounding environment is bright and switches a display on the sub-display 18 to the normal display. That is, as shown in FIG. 6, the display control unit 80a displays the contents of the current settings of the digital camera 1 on the sub-display 18. On the other hand, in a case in which the brightness is equal to or lower than the threshold value, the display control unit 80a determines that the surrounding environment is dark and displays the image, which represents the set state of the shutter speed dial 33, on the sub-display 18.

The image data of the image picture Im1 of the shutter speed dial 33 and the image data of the image picture Im2 of the indicator 34 are stored in the data memory 64. In a case in which the display control unit 80a is to display the image, which represents the set state of the shutter speed dial 33, on the sub-display 18, the display control unit 80a acquires the image data of the image picture Im1 of the shutter speed dial 33 and the image data of the image picture Im2 of the indicator 34 from the data memory 64 and generates data to be displayed on the sub-display 18. Then, the display control unit 80a drives the sub-display drive unit 72 on the basis of generated expression data and displays information on the sub-display 18.

In a case in which the shutter speed dial 33 is rotationally operated during the display of the image representing the set state of the shutter speed dial 33, the display control unit 80a also changes the image representing the set state of the shutter speed dial 33. In a case in which the display control unit 80a displays the image picture Im1 of the shutter speed dial 33 as the image representing the set state of the shutter speed dial 33, the display control unit 80a rotates the image picture Im in conjunction with the rotation of the shutter speed dial 33. That is, the image picture Im is rotated like an animation.

Figure 10:
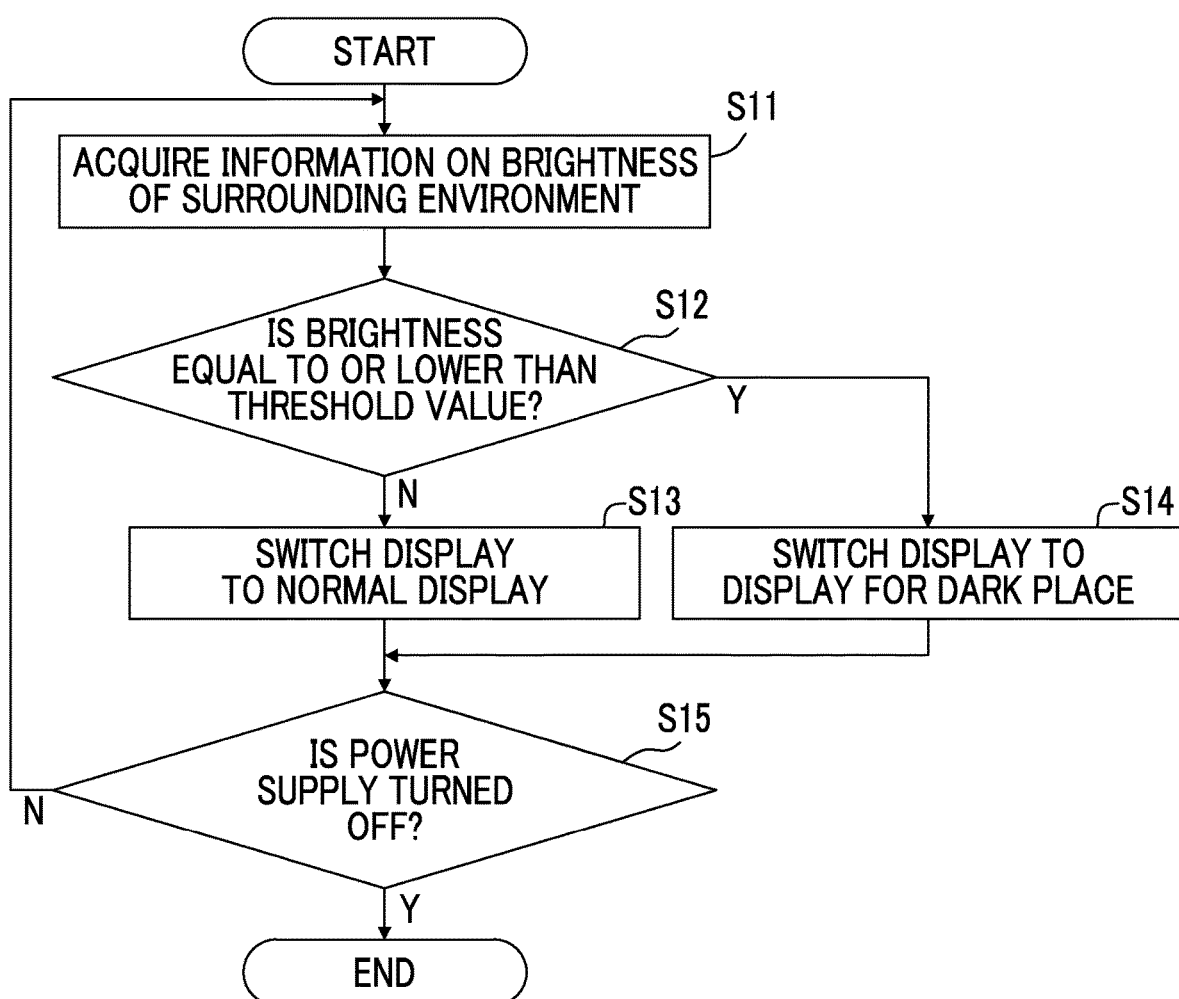
FIG. 10 is a flowchart showing the procedure of display processing on a sub-display performed by the display control unit.

FIG. 10 is a flowchart showing the procedure of display processing on the sub-display performed by the display control unit.

First, the display control unit 80a acquires information on the brightness of the surrounding environment (Step S11). The display control unit 80a acquires the information on the brightness of the surrounding environment from the brightness detection unit 76.

Next, the display control unit 80a determines whether or not the brightness of the surrounding environment is equal to or lower than a threshold value on the basis of the acquired information on the brightness (Step S12). That is, the display control unit 80a determines whether or not the brightness of the surrounding environment is equal to or lower than certain brightness.

If the brightness of the surrounding environment is not equal to or lower than the threshold value, that is, if the surrounding environment is bright, the display control unit 80a switches a display on the sub-display 18 to the normal display (Step S13). That is, the display control unit 80a acquires the current setting information of the digital camera 1, and displays the contents of the current settings of the digital camera 1 on the sub-display 18 with a predetermined layout as shown in FIG. 6.

On the other hand, if the brightness of the surrounding environment is equal to or lower than the threshold value, that is, if the surrounding environment is dark, the display control unit 80a switches a display on the sub-display 18 to the display for a dark place (Step S14). That is, the display control unit 80a acquires the current setting information of the digital camera 1 and the setting information of the shutter speed dial 33, and displays the contents of the current settings of the digital camera 1 and the image, which represents the set state of the shutter speed dial 33, on the sub-display 18 as shown in FIG. 8.

After that, the display control unit 80a determines whether or not the power supply is turned off (Step S15). If the power supply is turned off, the display control unit 80a ends processing. On the other hand, if the power supply is not turned off, the display control unit 80a returns to Step S11 and repeatedly performs the above-mentioned respective pieces of processing.

As described above, in the digital camera 1 of this embodiment, a display on the sub-display 18 is switched according to the brightness of the surrounding environment and the contents of settings of the camera are displayed on the display unit in a situation in which the surrounding environment is bright. On the other hand, the image representing the set state of the shutter speed dial 33 is displayed in a case in which the surrounding environment is dark. Accordingly, the shutter speed dial 33 can be appropriately operated even in a situation in which the surrounding environment is dark. Further, since the image representing the set state of the shutter speed dial 33 is displayed only in a situation in which the surrounding environment is dark, there is no damage to operability in a situation in which the surrounding environment is bright.

Furthermore, since the display control unit 80a displays the image picture Im1 imitating the shutter speed dial 33 in a case in which the display control unit 80a is to display the image representing the set state of the shutter speed dial 33, a relationship between the shutter speed dial 33 and a display on the sub-display 18 becomes clear. Accordingly, an intuitively clear operation system can be provided.

Moreover, since the sub-display 18 is disposed adjacent to the shutter speed dial 33 and the image picture Im1 of the shutter speed dial 33 is displayed on the side close to the shutter speed dial 33, a relationship between the image picture Im1 and the shutter speed dial 33 can be made clearer.

Further, since a display on the sub-display 18 is changed in conjunction with the operation of the shutter speed dial 33, good operability can be ensured.

Second Embodiment

In a digital camera of this embodiment, the image representing the set state of the shutter speed dial is displayed on a sub-display in a case in which the surrounding environment is darkened and the shutter speed dial is rotationally operated.

The structure other than a structure, which is related with the display control of the sub-display, is the same as the structure of the digital camera 1 of the first embodiment.

Accordingly, only a portion related with the display control of the sub-display will be described here.

Figure 11:
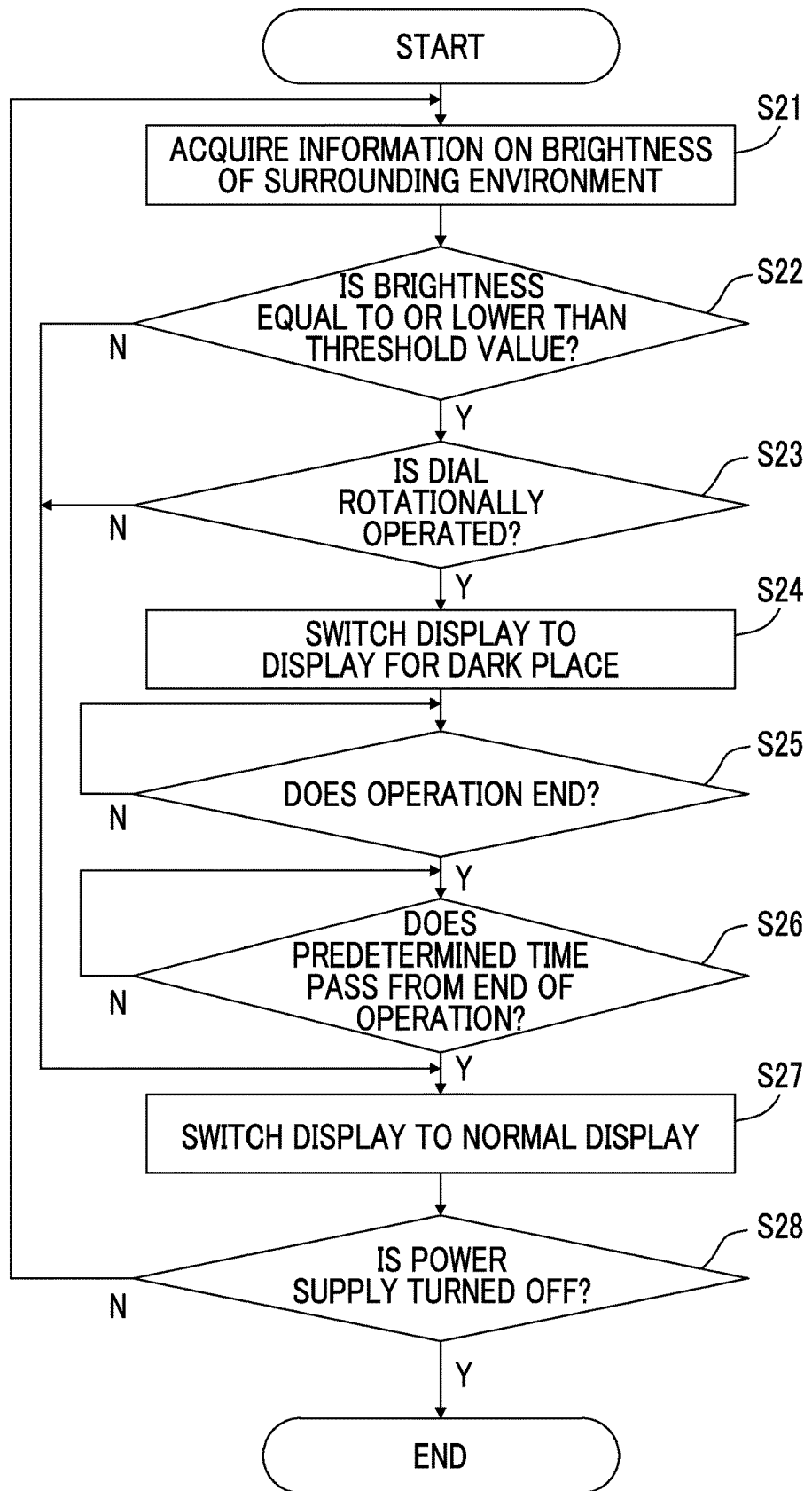
FIG. 11 is a flowchart showing the procedure of display processing on the sub-display performed by the display control unit.

FIG. 11 is a flowchart showing the procedure of display processing on the sub-display performed by the display control unit.

First, the display control unit 80a acquires information on the brightness of the surrounding environment (Step S21). The display control unit 80a acquires the information on the brightness of the surrounding environment from the brightness detection unit 76.

Next, the display control unit 80a determines whether or not the brightness of the surrounding environment is equal to or lower than a threshold value on the basis of the acquired information on the brightness (Step S22). That is, the display control unit 80a determines whether or not the brightness of the surrounding environment is equal to or lower than certain brightness.

If the brightness of the surrounding environment is not equal to or lower than the threshold value, the display control unit 80a switches a display on the sub-display 18 to the normal display (Step S27). That is, the display control unit 80a displays the contents of the current settings of the digital camera 1 on the sub-display 18 as shown in FIG. 6.

On the other hand, if the brightness of the surrounding environment is equal to or lower than the threshold value, the display control unit 80a determines whether or not the shutter speed dial 33 is rotationally operated on the basis of information obtained from the operation unit 74 (Step S23).

If the shutter speed dial 33 is not rotationally operated, the display control unit 80a switches a display on the sub-display 18 to the normal display (Step S27). That is, the display control unit 80a acquires the current setting information of the digital camera 1, and displays the contents of the current settings of the digital camera 1 on the sub-display 18 with a predetermined layout as shown in FIG. 6.

On the other hand, if the shutter speed dial 33 is rotationally operated, the display control unit 80a switches a display on the sub-display 18 to the display for a dark place (Step S24). That is, the display control unit 80a acquires the current setting information of the digital camera 1 and the setting information of the shutter speed dial 33, and displays the contents of the current settings of the digital camera 1 and the image, which represents the set state of the shutter speed dial 33, on the sub-display 18 as shown in FIG. 8.

The display control unit 80a switches a display on the sub-display 18 to the display for a dark place during the rotational operation of the shutter speed dial 33. In this case, the display control unit 80a changes a display in conjunction with the operation of the shutter speed dial 33. In a case in which the display control unit 80a displays the image picture Im1 of the shutter speed dial 33 on the sub-display 18 as the image representing the set state of the shutter speed dial 33, the display control unit 80a rotates the image picture Im in conjunction with the rotational operation of the shutter speed dial 33.

The display control unit 80a determines whether or not the rotational operation of the shutter speed dial 33 ends (Step S25). The display control unit 80a continues to switch a display on the sub-display 18 to the display for a dark place during the operation.

If the rotational operation of the shutter speed dial 33 ends, the display control unit 80a determines whether or not a predetermined time passes from the end of the operation (Step S26). That is, even though the operation ends, the display for a dark place is continued for the predetermined time.

If the predetermined time passes after the rotational operation of the shutter speed dial 33 ends, the display control unit 80a switches a display on the sub-display 18 to the normal display (Step S27).

After that, the display control unit 80a determines whether or not the power supply is turned off (Step S28). If the power supply is turned off, the display control unit 80a ends processing. On the other hand, if the power supply is not turned off, the display control unit 80a returns to Step S21 and repeatedly performs the above-mentioned respective pieces of processing.

In the digital camera of this embodiment, as described above, a display on the sub-display 18 is switched to the display for a dark place only in a case in which the shutter speed dial 33 is rotationally operated. That is, as long as the shutter speed dial 33 is not rotationally operated even though the surrounding environment is dark, the normal display is maintained. Accordingly, since a display on the sub-display 18 can be switched to a display suitable for a situation in which the digital camera 1 is used, the operability of the entire digital camera can be further improved.

Third Embodiment

In a digital camera of this embodiment, the image representing the set state of the shutter speed dial is displayed on the sub-display in a case in which the surrounding environment is darkened and the shutter speed dial is touched by a finger.

The structure other than a structure, which is related with the display control of the sub-display, is the same as the structure of the digital camera 1 of the first embodiment. Accordingly, only a portion related with the display control of the sub-display will be described here.

Figure 12:
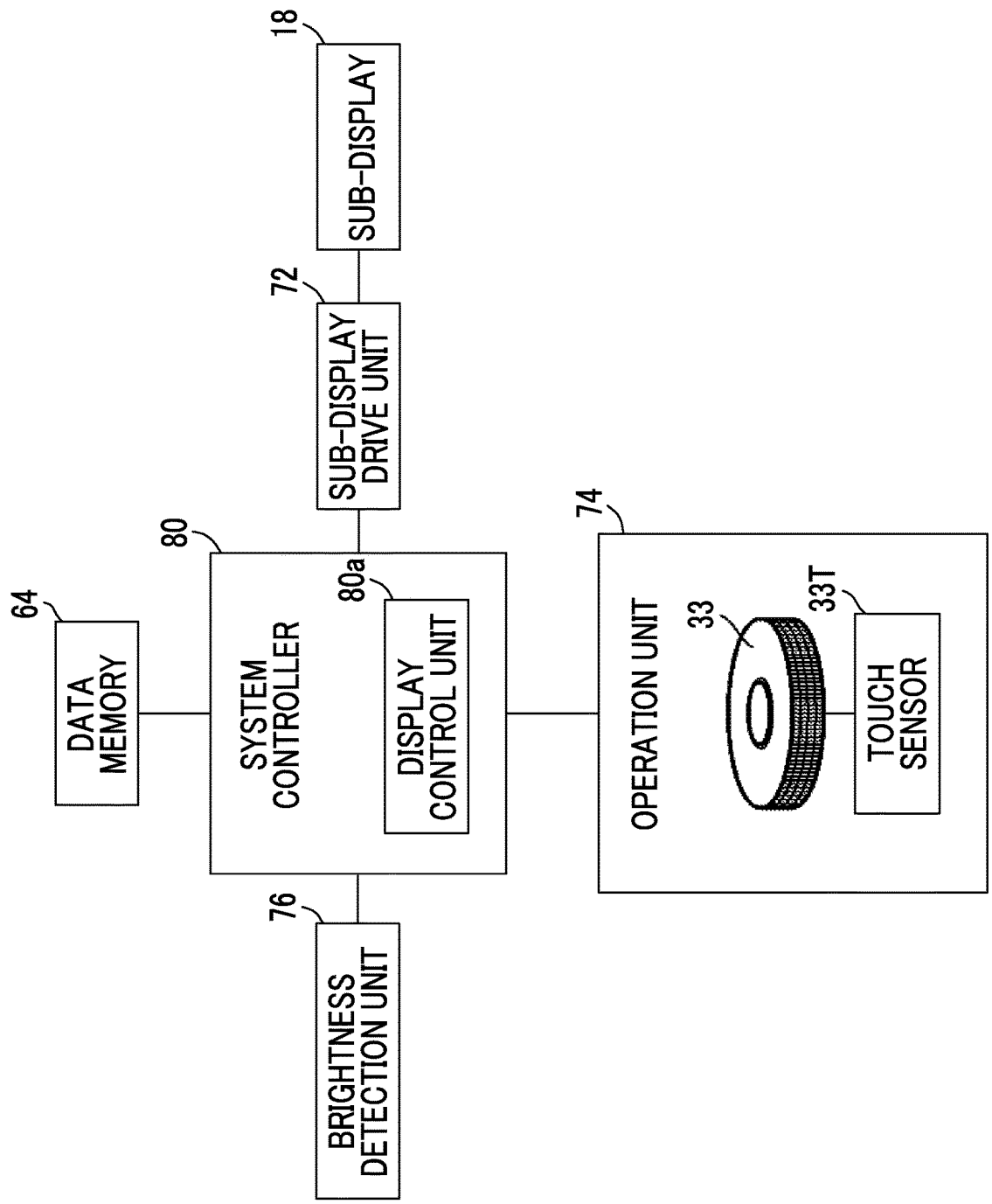
FIG. 12 is a functional block diagram of the display control unit.

FIG. 12 is a functional block diagram of the display control unit.

The shutter speed dial 33 is provided with a touch sensor 33T as a touch detection unit. The touch sensor 33T detects a touch with the shutter speed dial 33. The touch sensor 33T is provided on, for example, the dial plate 33a of the shutter speed dial 33.

The display control unit 80a controls a display on the sub-display 18 on the basis of information obtained from the brightness detection unit 76 and the operation unit 74.

Figure 13:
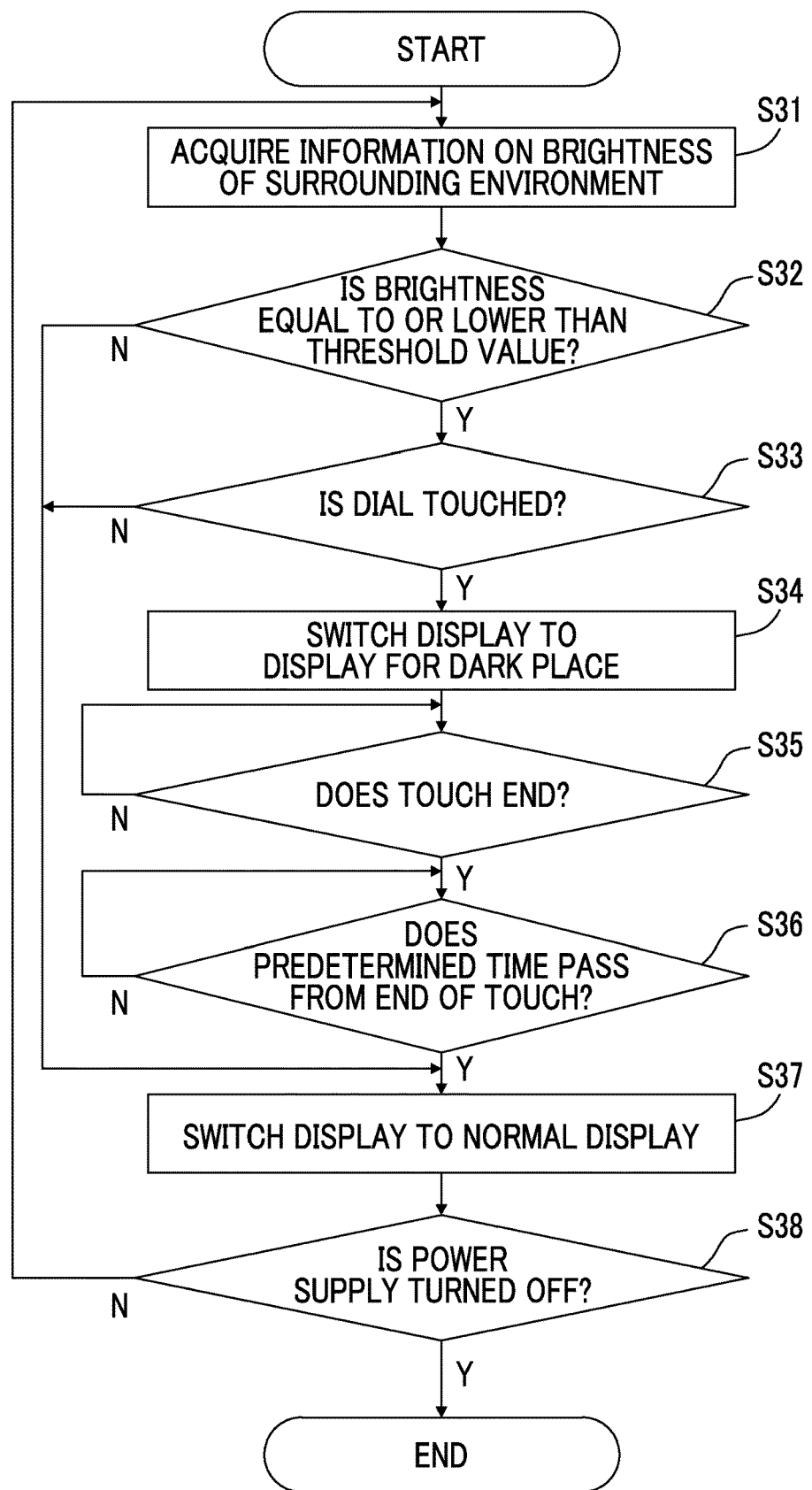
FIG. 13 is a flowchart showing the procedure of display processing on the sub-display performed by the display control unit.

FIG. 13 is a flowchart showing the procedure of display processing on the sub-display performed by the display control unit.

First, the display control unit 80a acquires information on the brightness of the surrounding environment (Step S31). The display control unit 80a acquires the information on the brightness of the surrounding environment from the brightness detection unit 76.

Next, the display control unit 80a determines whether or not the brightness of the surrounding environment is equal to or lower than a threshold value on the basis of the acquired information on the brightness (Step S32). That is, the display control unit 80a determines whether or not the brightness of the surrounding environment is equal to or lower than certain brightness.

If the brightness of the surrounding environment is not equal to or lower than the threshold value, the display control unit 80a switches a display on the sub-display 18 to the normal display (Step S37). That is, the display control unit 80a displays the contents of the current settings of the digital camera 1 on the sub-display 18 as shown in FIG. 6.

On the other hand, if the brightness of the surrounding environment is equal to or lower than the threshold value, the display control unit 80*a* determines whether or not the shutter speed dial 33 is touched on the basis of the information obtained from the operation unit 74 (Step S33). Specifically, the display control unit 80*a* determines whether or not the shutter speed dial 33 is touched on the basis of an output from the touch sensor 33T.

If the shutter speed dial 33 is not touched, the display control unit 80*a* switches a display on the sub-display 18 to the normal display (Step S37). That is, the display control unit 80*a* acquires the current setting information of the digital camera 1, and displays the contents of the current settings of the digital camera 1 on the sub-display 18 with a predetermined layout as shown in FIG. 6.

On the other hand, if the shutter speed dial 33 is touched, the display control unit 80*a* switches a display on the sub-display 18 to the display for a dark place (Step S34). That is, the display control unit 80*a* acquires the current setting information of the digital camera 1 and the setting information of the shutter speed dial 33, and displays the contents of the current settings of the digital camera 1 and the image, which represents the set state of the shutter speed dial 33, on the sub-display 18 as shown in FIG. 8.

The display control unit 80*a* switches a display on the sub-display 18 to the display for a dark place while the shutter speed dial 33 is touched. At this time, the display control unit 80*a* changes a display in conjunction with the rotation of the shutter speed dial 33 in a case in which the shutter speed dial 33 is rotationally operated.

The display control unit 80*a* determines whether or not a touch with the shutter speed dial 33 ends (Step S35). The display control unit 80*a* continues to switch a display on the sub-display 18 to the display for a dark place while the shutter speed dial 33 is touched.

If a touch with the shutter speed dial 33 ends, the display control unit 80*a* determines whether or not a predetermined time passes from the end of the touch (Step S36). That is, even though the touch ends, the display for a dark place is continued for the predetermined time.

If the predetermined time passes after the touch with the shutter speed dial 33 ends, the display control unit 80*a* switches a display on the sub-display 18 to the normal display (Step S37).

After that, the display control unit 80*a* determines whether or not the power supply is turned off (Step S38). If the power supply is turned off, the display control unit 80*a* ends processing. On the other hand, if the power supply is not turned off, the display control unit 80*a* returns to Step S31 and repeatedly performs the above-mentioned respective pieces of processing.

In the digital camera of this embodiment, as described above, a display on the sub-display 18 is switched to the display for a dark place only in a case in which the shutter speed dial 33 is touched. That is, as long as the shutter speed dial 33 is not touched even though the surrounding environment is dark, the normal display is maintained. Accordingly, since a display on the sub-display 18 can be switched to a display suitable for a situation in which the digital camera 1 is used, the operability of the entire digital camera can be further improved.

Other Embodiments

<<Other Examples of Image Representing Set State of Dial>>

The image picture Im imitating the appearance of the shutter speed dial 33 has been displayed as the image representing the set state of the dial in the above-mentioned embodiments, but the image representing the set state of the shutter speed dial is not limited thereto.

Example 1

Figure 14:
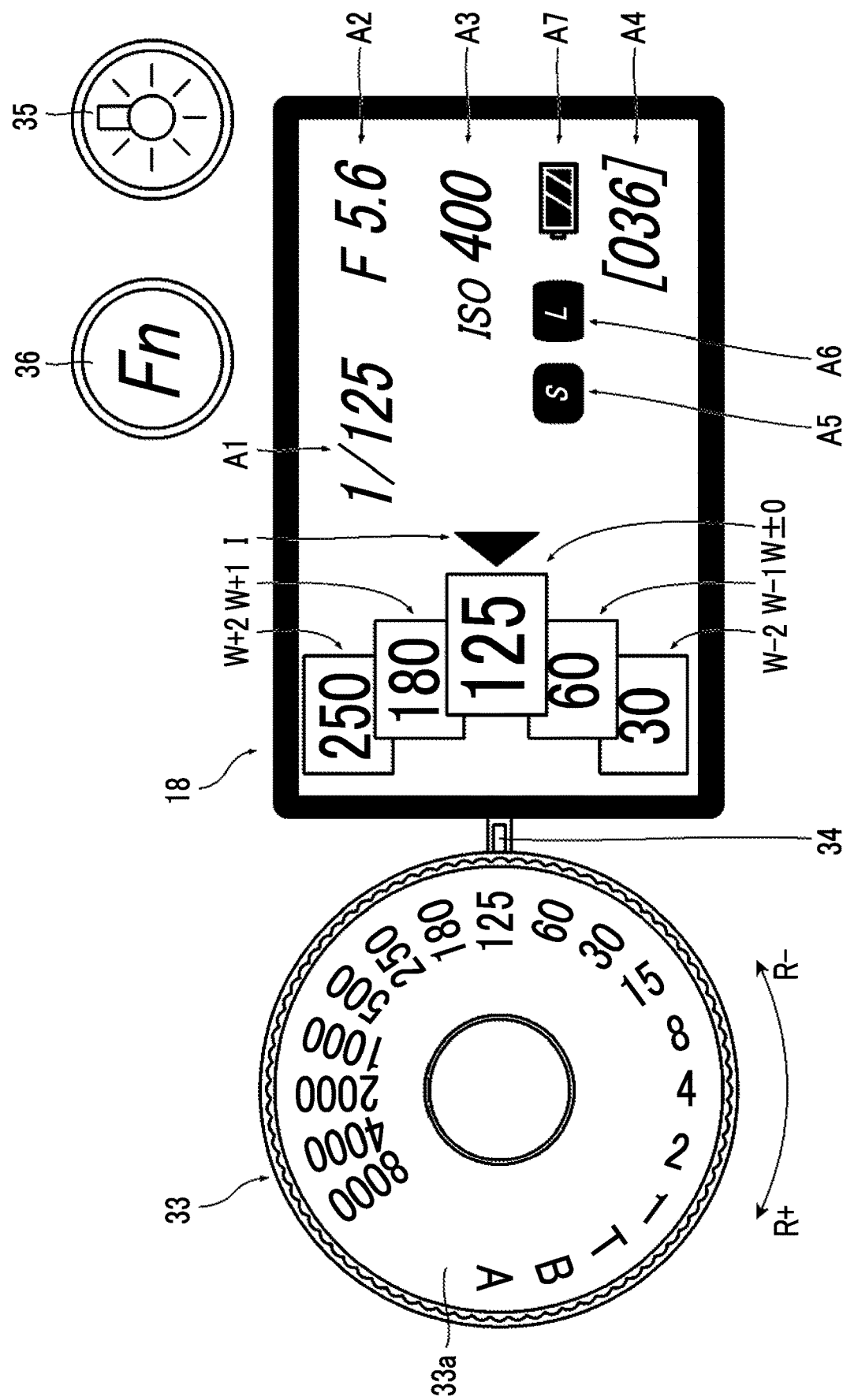
FIG. 14 is a diagram showing another example of an image representing the set state of the dial.

FIG. 14 is a diagram showing another example of the image representing the set state of the dial.

In the example shown in FIG. 14, a currently selected shutter speed, shutter speeds that are selectable in a case in which the shutter speed dial 33 is rotated in a normal direction, and shutter speeds that are selectable in a case in which the shutter speed dial 33 is rotated in a reverse direction are displayed in window images W+2, W+1, W±0, W−1, and W−2, which are arranged in an arc shape, and form an image representing the set state of the shutter speed dial.

The reciprocal of the currently selected shutter speed is displayed in the middle window image W±0. The middle window image W±0 is displayed to be larger than other window images. Further, the middle window image W±0 is indicated by an indicator image I.

The reciprocals of the shutter speeds, which are selectable in a case in which the shutter speed dial 33 is rotated in the normal direction, are displayed in the window images W+1 and W+2. The reciprocal of the shutter speed, which is selectable in a case in which the shutter speed dial 33 is rotated in the normal direction by one stage (one click), is displayed in the window image W+1. The reciprocal of the shutter speed, which is selectable in a case in which the shutter speed dial 33 is rotated in the normal direction by two stages (two clicks), is displayed in the window image W+2.

The reciprocals of the shutter speeds, which can be selected in a case in which the shutter speed dial 33 is rotated in the reverse direction, are displayed in the window images W−1 and W−2. The reciprocal of the shutter speed, which is selectable in a case in which the shutter speed dial 33 is rotated in the reverse direction by one stage, is displayed in the window image W−1. The reciprocal of the shutter speed, which is selectable in a case in which the shutter speed dial 33 is rotated in the reverse direction by two stages, is displayed in the window image W−2.

In a case in which the shutter speed dial 33 is rotated in the normal direction by one stage, all of the window images W+2, W+1, W±0, W−1, and W−2 are rotated clockwise and a display is switched. Further, in a case in which the shutter speed dial 33 is rotated in the reverse direction by one stage, all of the window images W+2, W+1, W±0, W−1, and W−2 are rotated counterclockwise and a display is switched.

A direction where the shutter speed dial 33 is operated with respect to the indicator 34 coincides with a direction where a display is switched. For this reason, an operation is easy. Furthermore, since the selected shutter speed is enlarged and displayed, an operation of selection can also be easy.

The shutter speeds, which correspond to two stages ahead, have been displayed in this example, but it is preferable that the number of the displays is appropriately set according to the size of the sub-display 18, and the like.

Example 2

Figure 15:
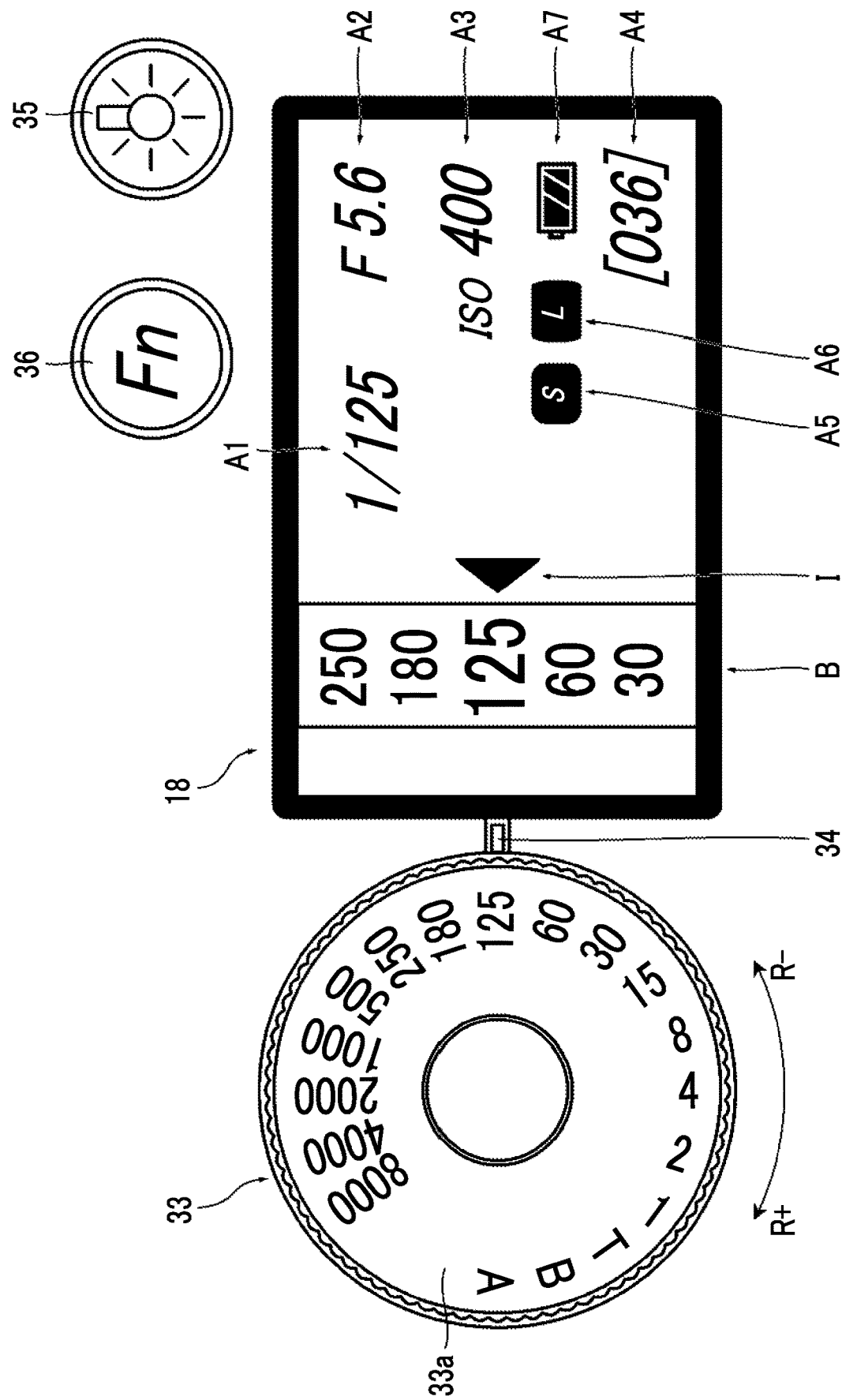
FIG. 15 is a diagram showing another example of an image representing the set state of the dial.

FIG. 15 is a diagram showing another example of the image representing the set state of the dial.

In the example shown in FIG. 15, a currently selected shutter speed, shutter speeds that are selectable in a case in which the shutter speed dial 33 is rotated in the normal direction, and shutter speeds that are selectable values in a case in which the shutter speed dial 33 is rotated in the reverse direction are displayed in a band-like area B so as to be arranged vertically and form an image representing the set state of the shutter speed dial.

The reciprocal of the currently selected shutter speed is displayed in the middle. The currently selected shutter speed is displayed to be larger than other displays. Further, the currently selected shutter speed is indicated by an indicator image I.

The reciprocals of the shutter speeds, which are selectable in a case in which the shutter speed dial 33 is rotated in the normal direction, are displayed above the currently selected shutter speed. An example in which the shutter speeds, which correspond to two stages ahead, are displayed is shown in this example.

The reciprocals of the shutter speeds, which are selectable in a case in which the shutter speed dial 33 is rotated in the reverse direction, are displayed below the currently selected shutter speed. An example in which the shutter speeds, which correspond to two stages ahead, are displayed is shown in this example.

In a case in which the shutter speed dial 33 is rotated in the normal direction by one stage, a display in the area B overall slides down and is switched. Further, in a case in which the shutter speed dial 33 is rotated in the reverse direction by one stage, a display in the area B overall slides up and is switched.

A direction where the shutter speed dial 33 is operated with respect to the indicator 34 substantially coincides with a direction where a display is switched. For this reason, an operation is easy. Furthermore, since the selected shutter speed is enlarged and displayed, an operation of selection can also be easy.

The shutter speeds, which correspond to two stages ahead, have been displayed in this example, but it is preferable that the number of the displays is appropriately set according to the size of the sub-display 18, and the like.

Example 3

Figure 16:
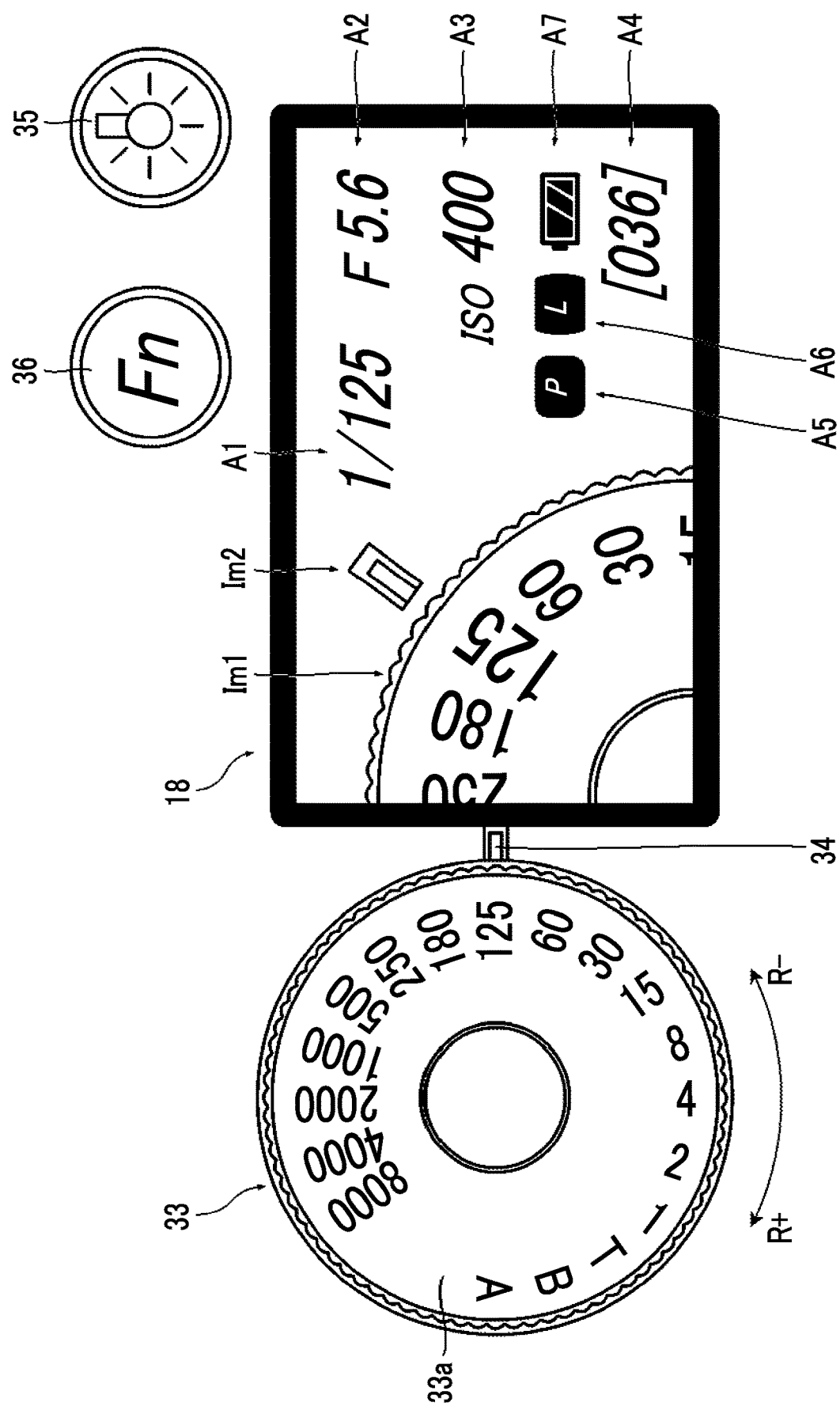
FIG. 16 is a diagram showing another example of an image representing the set state of the dial.

FIG. 16 is a diagram showing another example of the image representing the set state of the dial.

In the example shown in FIG. 16, the image of a part of the shutter speed dial 33, which is cut out and is enlarged, is displayed as the image picture Im and is displayed to be larger than the actual shutter speed dial 33.

Since the image of a part of the dial, which is cut out and is enlarged, is displayed as the image picture Im as described above, the numerical value of the dial plate can be made to be easily seen. Accordingly, operability can be further improved. Further, since a space where the contents of settings of the digital camera 1 are displayed can also be ensured, the sub-display 18 can be effectively used.

Example 4

Figure 17:
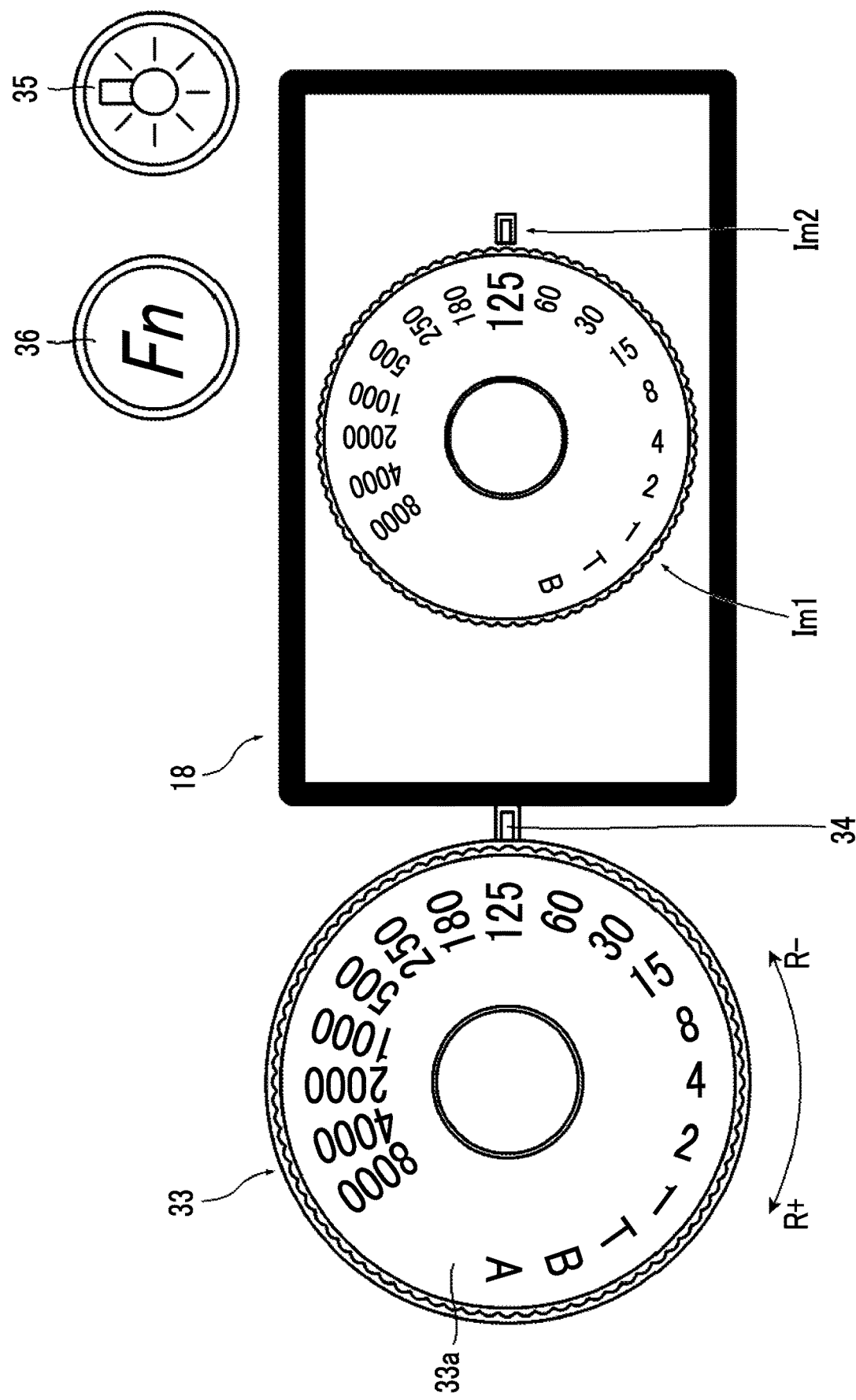
FIG. 17 is a diagram showing another example of an image representing the set state of the dial.

FIG. 17 is a diagram showing another example of the image representing the set state of the dial.

In the example shown in FIG. 17, only the image representing the set state of the dial is displayed on the sub-display 18 as the display for a dark place. Further, the image picture Im of the entire shutter speed dial 33 is displayed.

As described above, only the image representing the set state of the dial can also be adapted to be displayed as the display for a dark place.

<<Other Examples of Dial>>

A case in which the dial provided on the camera body is a shutter speed dial has been described by way of example in the above-mentioned embodiments, but the dial provided on the camera body is not limited thereto. Alternatively, a sensitivity dial that is used to set ISO sensitivity, an exposure correction dial that is used to set an exposure correction value, an imaging mode dial that is used to set an imaging mode, and the like may be provided on the camera body as the dials; and images representing the set states of these dials may be displayed on the sub-display 18.

Furthermore, the image of the dial, which is shown in plan view, has been displayed as the image picture of the dial in the above-mentioned embodiments, but an image, which is shown in perspective view, may be displayed.

<Case in which Plural Dials are Provided>

A case in which the invention is applied to a camera including only the shutter speed dial on the camera body has been described by way of example in the above-mentioned embodiments, but a plurality of dials can be provided on the camera body.

Figure 18:
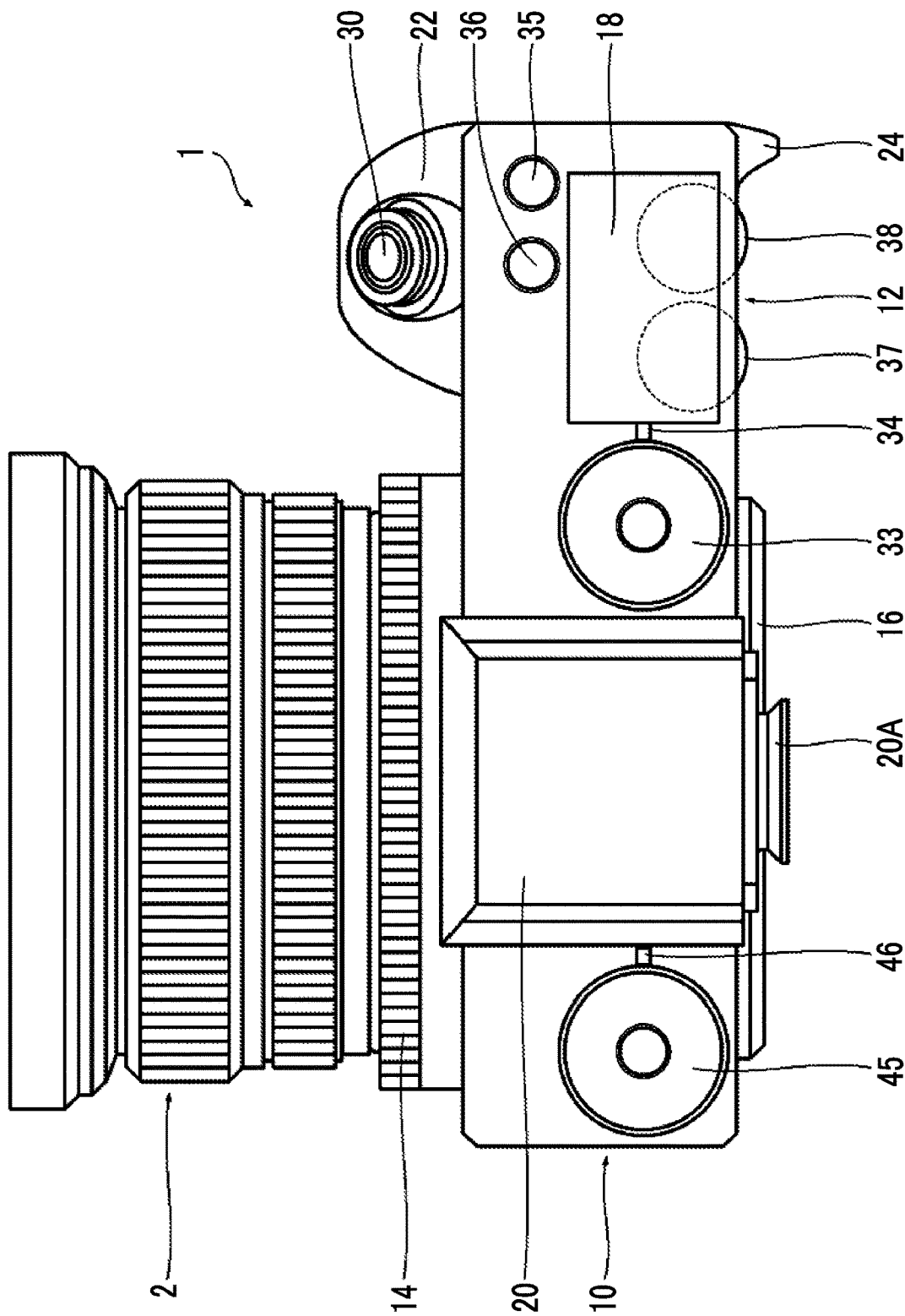
FIG. 18 is a plan view showing the appearance of a digital camera that includes a sensitivity dial and a shutter speed dial on a camera body.

FIG. 18 is a plan view showing the appearance of a digital camera that includes a sensitivity dial and a shutter speed dial on a camera body. Further, FIG. 19 is a plan view of the sensitivity dial.

As shown in FIG. 18, the shutter speed dial 33 and a sensitivity dial 45 are disposed on the top surface of the camera body 10 with the electronic view finder 20 interposed therebetween.

The sensitivity dial 45 is formed of a rotary dial. The sensitivity dial 45 has the shape of a disc, and is adapted to be capable of endlessly rotating about an axis.

Figure 19:
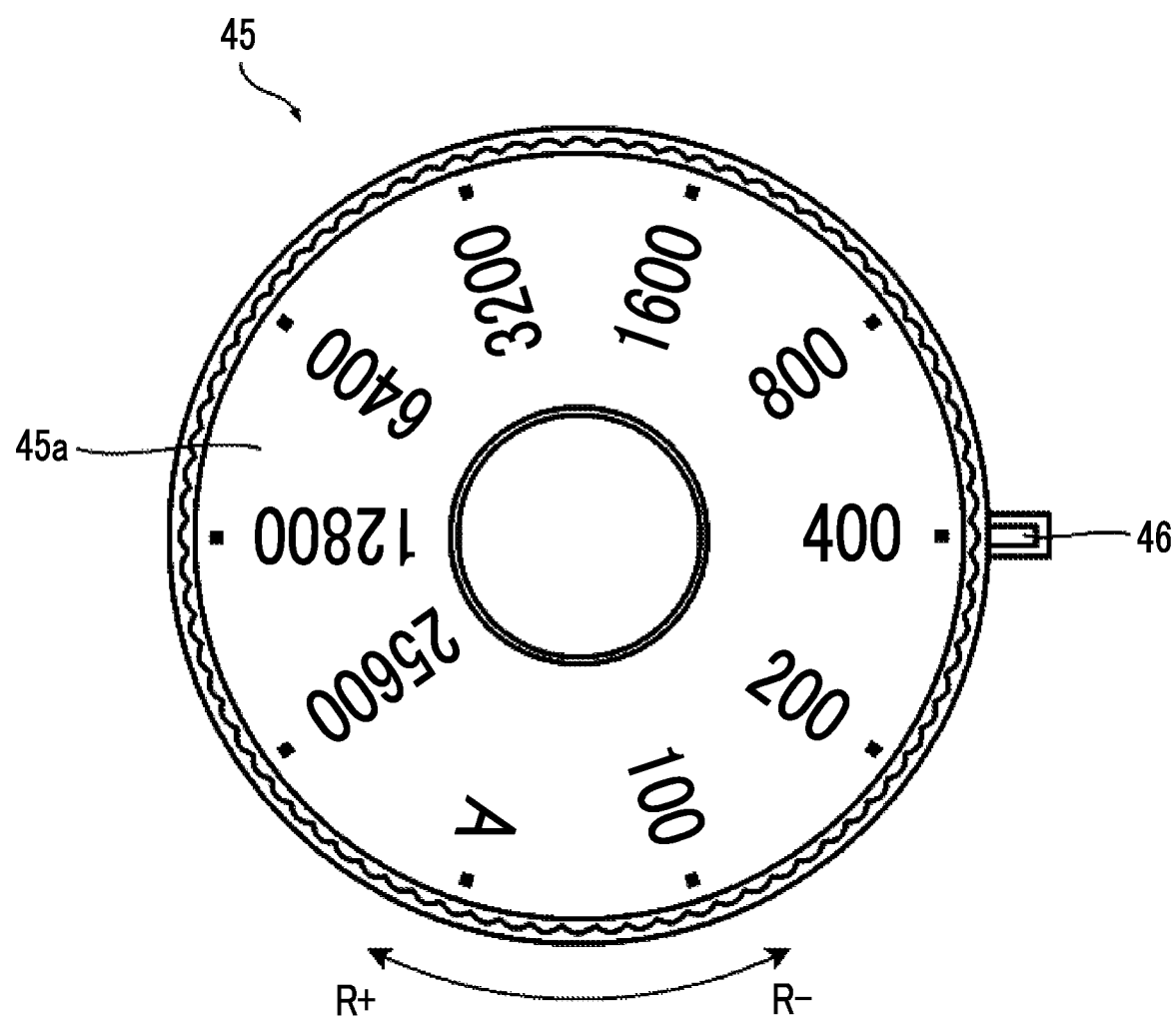
FIG. 19 is a plan view of the sensitivity dial.

As shown in FIG. 19, the sensitivity dial 45 includes a dial plate 45*a* on the top surface (upper surface) thereof. Selectable values of sensitivity are displayed on the dial plate 45*a* as selectable items. The selectable values of sensitivity are displayed at regular intervals in a rotation direction. In the digital camera 1 of this embodiment, 100, 200, 400, 800, 1600, 3200, 6400, 12800, and 25600 are prepared as the selectable values of sensitivity. Further, automatic sensitivity is prepared as an item to be capable of being selected by the sensitivity dial 45. The automatic sensitivity is a mode where the digital camera automatically sets sensitivity. The mark of the automatic sensitivity displayed on the dial plate is "A". Automatic sensitivity is set in a case in which "A" displayed on the dial plate is selected.

An indicator 46, which is used to select sensitivity, is provided near the sensitivity dial 45. The indicator 46 is provided at a position corresponding to three o'clock in a case in which the indicator 46 is seen from the sensitivity dial 45. A user fits the mark of sensitivity, which is desired to be selected, to the position of the indicator 46 to select the sensitivity. For example, in a case in which a sensitivity of 400 is to be selected, a user rotates the sensitivity dial 45 to fit "400" of the marks of the dial plate 45*a* to the indicator 46.

The sensitivity dial 45 includes a click mechanism as in the shutter speed dial 33, and generates click feelings so as to correspond to the pitch of the marks of the dial plate 45*a* in a case in which the sensitivity dial 45 is rotationally operated. A position where the sensitivity dial 45 is to be click-stopped coincides with the position of the indicator 46. Accordingly, in a case in which the sensitivity dial 45 is rotated in a normal direction (in FIG. 19, a clockwise direction indicated by an arrow R+), the marks are moved up one by one by each click. Further, in a case in which the sensitivity dial 45 is rotated in a reverse direction (in FIG.

19, a counterclockwise direction indicated by an arrow R−), the marks are moved down one by one by each click.

In a case in which the sensitivity dial 45 and the shutter speed dial 33 are provided on the camera body 10 as in the digital camera 1 of this example and the surrounding environment is darkened, an image representing the set state of the operated dial is displayed on the sub-display 18.

Figure 20:
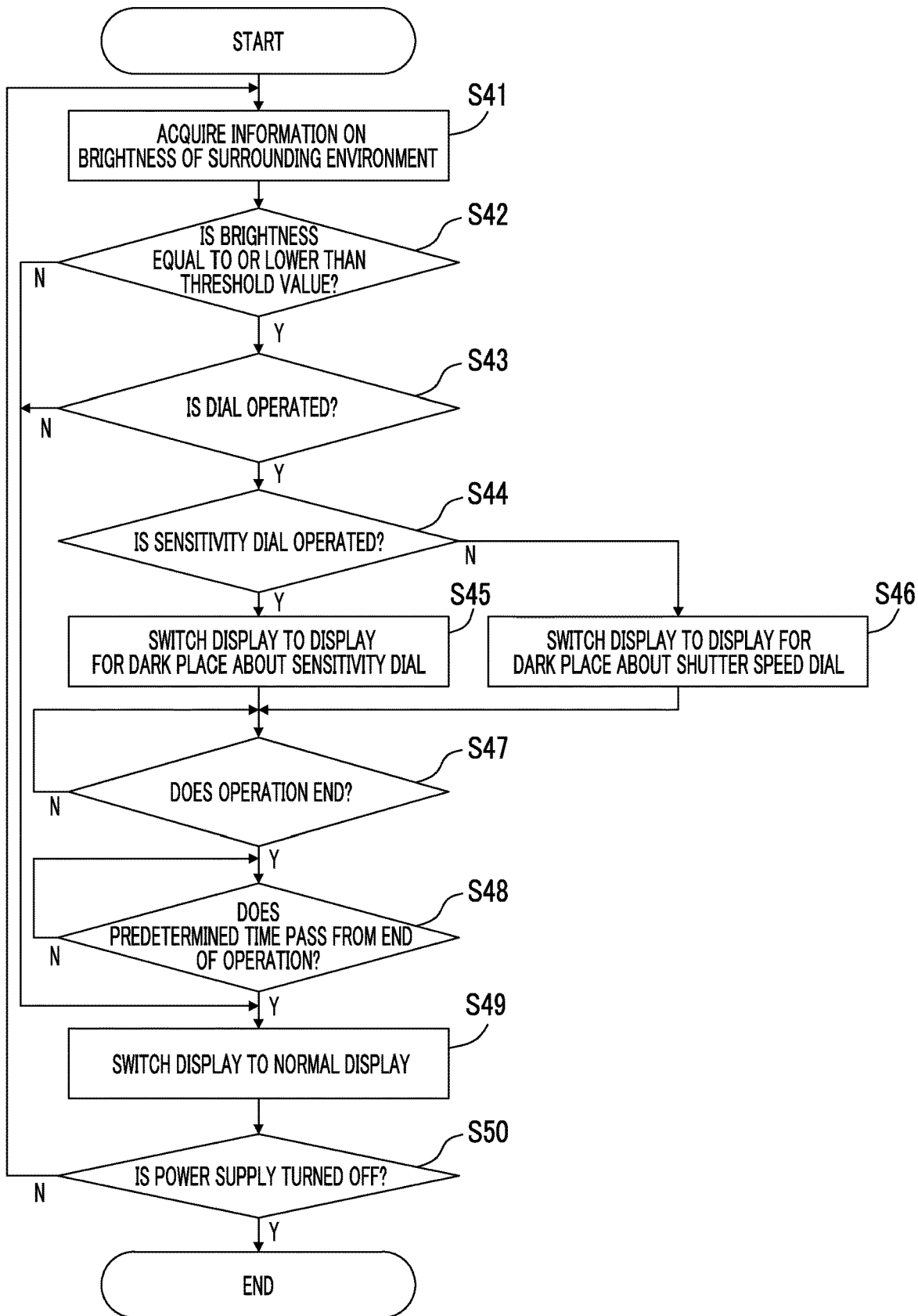
FIG. 20 is a flowchart showing the procedure of display processing on a sub-display performed by a display control unit.

FIG. 20 is a flowchart showing the procedure of display processing on the sub-display performed by the display control unit.

First, the display control unit 80a acquires information on the brightness of the surrounding environment (Step S41). The display control unit 80a acquires the information on the brightness of the surrounding environment from the brightness detection unit 76.

Next, the display control unit 80a determines whether or not the brightness of the surrounding environment is equal to or lower than a threshold value on the basis of the acquired information on the brightness (Step S42). That is, the display control unit 80a determines whether or not the brightness of the surrounding environment is equal to or lower than certain brightness.

If the brightness of the surrounding environment is not equal to or lower than the threshold value, the display control unit 80a switches a display on the sub-display 18 to the normal display (Step S49). That is, the display control unit 80a displays the contents of the current settings of the digital camera 1 on the sub-display 18 as shown in FIG. 6.

On the other hand, if the brightness of the surrounding environment is equal to or lower than the threshold value, the display control unit 80a determines whether or not the dial is operated on the basis of the information obtained from the operation unit 74 (Step S43).

If the dial is operated (Step S43), the display control unit 80a determines whether or not the operated dial is the sensitivity dial 45 (Step S44).

If the operated dial is the sensitivity dial 45, the display control unit 80a switches a display on the sub-display 18 to a display for a dark place about the sensitivity dial 45 (Step S45).

Figure 21:
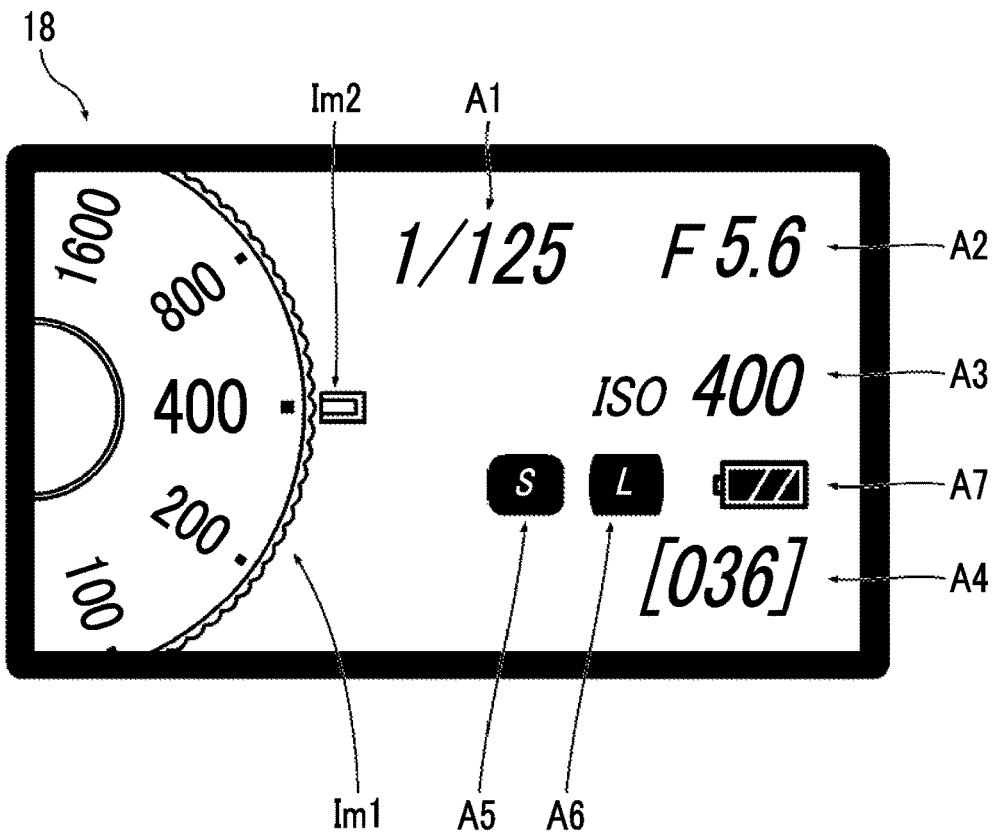
FIG. 21 is a diagram showing an example of a display for a dark place on a sub-display in a case in which the sensitivity dial is operated.

FIG. 21 is a diagram showing an example of a display for a dark place on the sub-display in a case in which the sensitivity dial is operated.

In a case in which the sensitivity dial is operated as shown in FIG. 21 in a situation in which the surrounding environment is dark, the contents of the current settings of the digital camera 1 and an image representing the set state of the sensitivity dial 45 are displayed on the sub-display 18.

In the example shown in FIG. 21, an image picture Im1 of the sensitivity dial 45 and an image picture Im2 of the indicator 46 are displayed on the sub-display 18 as the image representing the set state of the sensitivity dial 45. Particularly, in the example shown in FIG. 21, the image picture Im1 of a part of the sensitivity dial 45 and the image picture Im2 of the indicator 46 are displayed on the sub-display 18. Further, in the example shown in FIG. 21, selected sensitivity is enlarged and displayed so that the sensitivity selected by the sensitivity dial 45 is clear.

The contents of the current settings of the digital camera 1 are displayed in a margin area.

Since the image representing the set state of the sensitivity dial 45 is displayed on the sub-display 18 as described above in a case in which the surrounding environment is dark, the sensitivity dial 45 can be operated even in a situation in which the surrounding environment is dark.

If the operated dial is not the sensitivity dial 45, that is, the operated dial is the shutter speed dial 33, the display control unit 80a switches a display on the sub-display 18 to a display for a dark place about the shutter speed dial 33 as shown in FIG. 8 (Step S46).

The display control unit 80a switches a display on the sub-display 18 to the display for a dark place during the rotational operation of the dial. In this case, the display control unit 80a changes a display in conjunction with the operation of the dial.

The display control unit 80a determines whether or not the rotational operation of the dial ends (Step S47). The display control unit 80a continues to switch a display on the sub-display 18 to the display for a dark place during the operation.

If the rotational operation of the dial ends, the display control unit 80a determines whether or not a predetermined time passes from the end of the operation (Step S48). That is, even though the operation ends, the display for a dark place is continued for the predetermined time.

If the predetermined time passes after the rotational operation of the dial ends, the display control unit 80a switches a display on the sub-display 18 to the normal display (Step S49).

After that, the display control unit 80a determines whether or not the power supply is turned off (Step S50). If the power supply is turned off, the display control unit 80a ends processing. On the other hand, if the power supply is not turned off, the display control unit 80a returns to Step S41 and repeatedly performs the above-mentioned respective pieces of processing.

In a case in which a plurality of dials are provided on the camera body as described above, an image representing the set state of the operated dial is displayed on the sub-display 18 as the display for a dark place.

The display control unit 80a has been adapted to switch a display on the sub-display 18 in conjunction with the operation in the above-mentioned example, but may be adapted to switch a display on the sub-display 18 in conjunction with a touch with the dial. In this case, in a case in which the sensitivity dial 45 is touched, the display control unit 80a switches a display to the display for a dark place about the sensitivity dial 45. In a case in which the shutter speed dial 33 is touched, the display control unit 80a switches a display to the display for a dark place about the shutter speed dial 33.

<Another Form of Dial>

The shape of the dial has been the shape of a disc in the above-mentioned embodiments, but the form of the rotary dial is not limited thereto.

Figure 22:
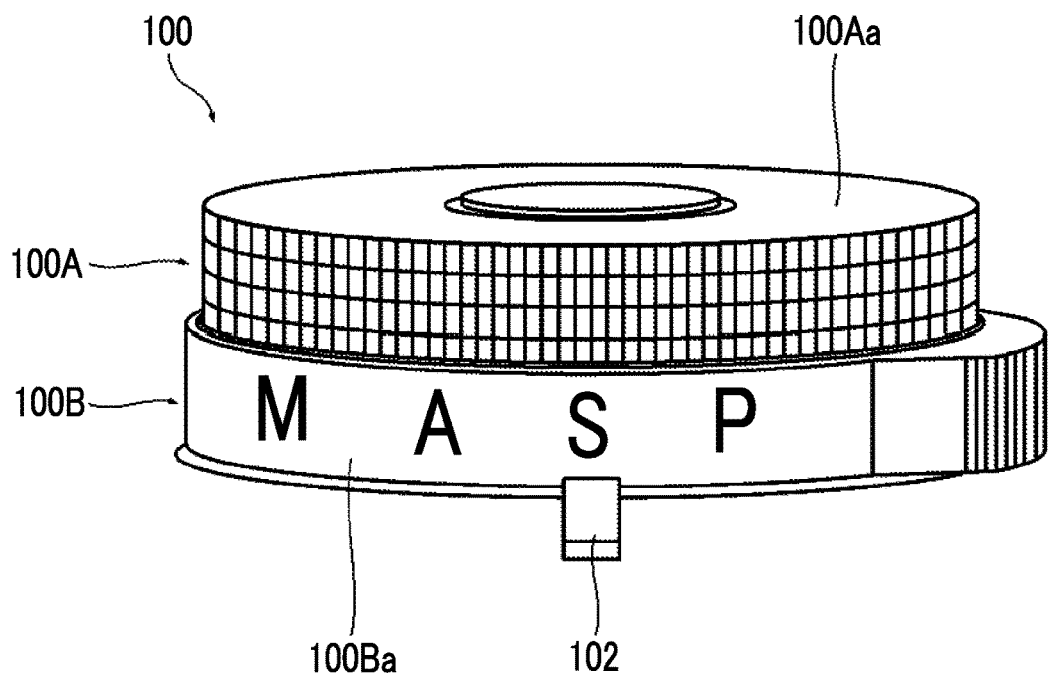
FIG. 22 is a perspective view of another form of the dial.

FIG. 22 is a perspective view of another form of the dial.

A dial 100 shown in FIG. 22 is a dial having a structure in which a first dial 100A having the shape of a disc and a second dial 100B having the shape of a ring are combined with each other. The first and second dials 100A and 100B are disposed coaxially with each other.

The first dial 100A includes a dial plate 100Aa on the top surface thereof, and a user fits each of items (not shown) displayed on the dial plate 100Aa to an indicator 102 to select each of the items displayed on the dial plate 100Aa.

The second dial 100B is rotated on the outer periphery of a base portion of the first dial 100A. The second dial 100B includes a dial plate 100Ba on the outer peripheral surface thereof, and a user fits each of items (P, S, A, and M) displayed on the dial plate 100Ba to the indicator 102 to select each of the items displayed on the dial plate 100Ba. The example shown in FIG. 22 shows a case in which the second dial 100B is used as a mode dial. The mode dial is a dial that is used to set an imaging mode. P denotes a program mode, S denotes a shutter speed priority mode, A denotes a stop priority mode, and M denotes a manual mode.

As in the case of the second dial 100B, the dial provided on the camera body can also be formed in the shape of a ring.

<Disposition of Dial>

The dial has been disposed on the top surface of the camera body in the above-mentioned embodiments, but a position where the dial is disposed is not limited thereto. For example, the dial can be disposed on the back of the camera body.

<<Other Examples of Sub-Display>>

The sub-display has been formed of a reflective LCD provided with an illumination lamp in the above-mentioned embodiments, but the structure of the sub-display is not limited thereto. Alternatively, the sub-display can also be formed of, for example, an electronic paper provided with an illumination lamp, a memory liquid crystal display provided with an illumination lamp, or the like.

The electronic paper is a thin display that has thinness and visibility at the same level as those of paper, and means a display of which contents to be displayed can be rewritten. The memory liquid crystal display is a liquid crystal display that has a function to be capable of maintaining contents displayed on a screen even though a power supply is turned off. Both of the electronic paper and the memory liquid crystal display can ensure good visibility even in an environment where surroundings are bright. Further, a display on the display unit can be confirmed even in a case in which the power supply of the camera is turned off <Control of Illumination Lamp of Sub-Display>

The illumination lamp of the sub-display may be controlled according to the brightness of the surrounding environment. That is, the illumination lamp may be adapted to be automatically turned on in a case in which the surrounding environment is darkened.

The control of the illumination lamp of the sub-display 18 is performed by the system controller 80. The system controller 80 functions as an illumination lamp-control unit 80b for the sub-display 18 by executing a predetermined control program.

Figure 23:
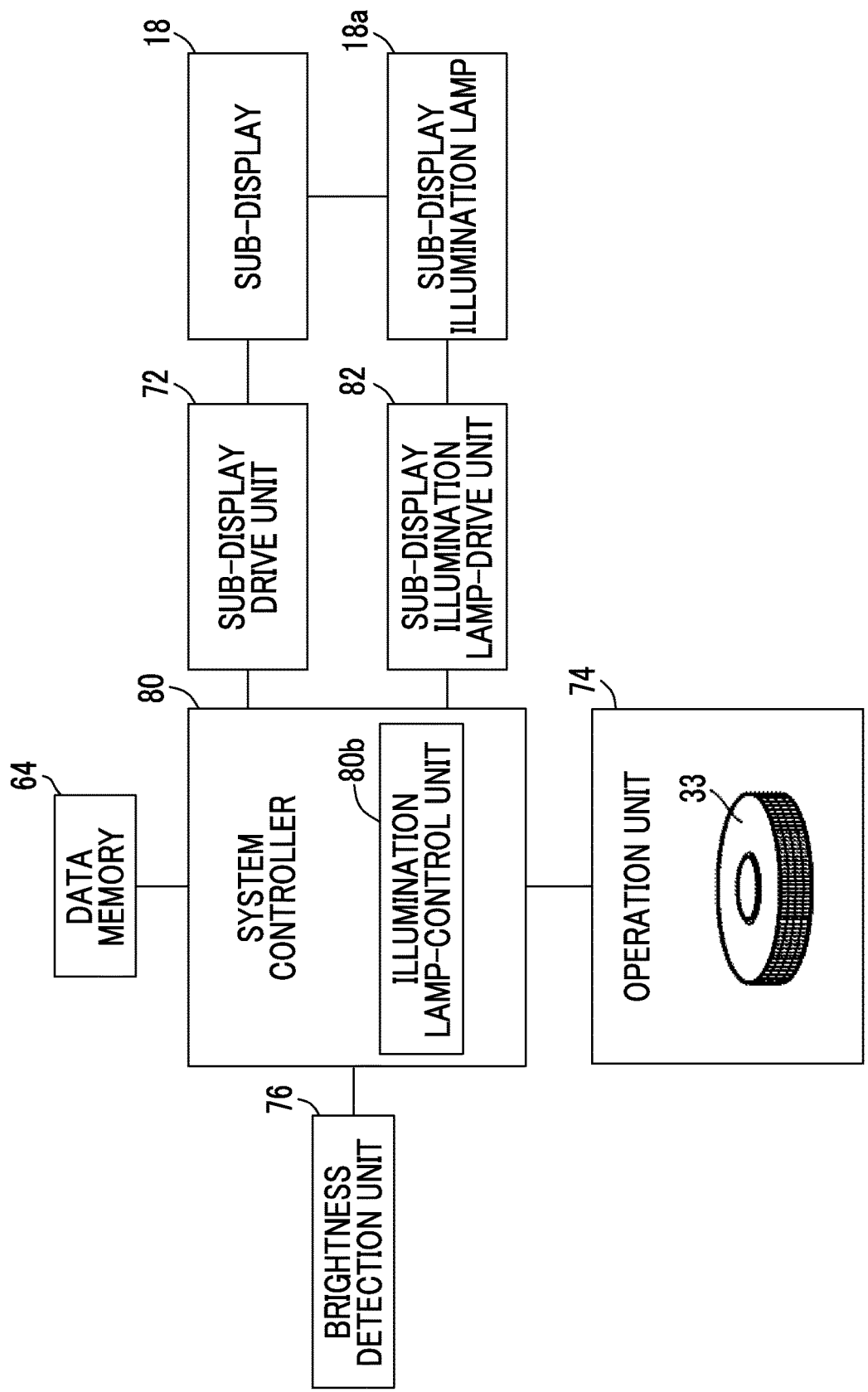
FIG. 23 is a functional block diagram of an illumination lamp-control unit.

FIG. 23 is a functional block diagram of the illumination lamp-control unit.

The sub-display 18 includes a sub-display illumination lamp 18a. A sub-display illumination lamp-drive unit 82 drives the sub-display illumination lamp 18a according to a command output from the system controller 80 that is the illumination lamp-control unit 80b.

The illumination lamp-control unit 80b controls the turning-on of the sub-display illumination lamp 18a according to the brightness of the surrounding environment. Specifically, the illumination lamp-control unit 80b acquires the detection result of brightness from the brightness detection unit 76, compares the acquired brightness and a threshold value, and turns on the sub-display illumination lamp 18a in a case in which the acquired brightness is equal to or lower than the threshold value. Accordingly, a display on the sub-display 18 can be made to be easily seen even in a situation in which the surroundings are dark.

The threshold value may be equal to the threshold value that is used in a case in which the display control of the sub-display 18 is performed. Further, a plurality of threshold values may be prepared to change the brightness of the sub-display illumination lamp 18a in stages. Accordingly, a display, which is more excellent in visibility, can be obtained.

Further, the turning-on/off of the sub-display illumination lamp 18a may be in conjunction with the operation of the dial or a touch with the dial as in the case of a display on the sub-display 18. That is, the sub-display illumination lamp 18a may be adapted to be automatically turned on in a case in which the surrounding environment is darkened and the dial is operated or touched, and to be automatically turned off in a case in which the operation of the dial ends or a touch with the dial ends.

<<Brightness Detection Unit>>

The imaging light has been used to detect the brightness of the surrounding environment in the above-mentioned embodiments, but means for detecting the brightness of the surrounding environment is not limited thereto. A sensor for detecting brightness may be provided on the camera body to directly detect the brightness of the surrounding environment. In this case, it is preferable that the sensor for detecting brightness is provided near the dial.

<<Main Display>>

In a case in which the surrounding environment is darkened, an image representing the set state of the dial has been displayed on the sub-display in the above-mentioned embodiments but may be displayed on the main display.

Further, the main display 16 has been fixed to the camera body 10 in the above-mentioned embodiments, but may be adapted to be movable in a free direction. That is, the main display 16 may be formed of a so-called variable-angle display.

FIG. 24 is a left side view showing an example of a digital camera of which a main display is formed of a variable-angle display.

As shown in FIG. 24, a main display 16 of a digital camera 1 of this example is tiltably supported by a main display-support mechanism 110. That is, the main display 16 is formed of a variable-angle display.

In a case in which the main display 16 is formed of a variable-angle display as described above, an image representing the set state of the dial may be displayed on the main display 16 in conjunction with an operation for tilting the main display 16. In this case, an image representing the set state of the dial is displayed on the main display 16 in a case in which brightness detected by the brightness detection unit is equal to or lower than a prescribed brightness and the main display 16 is set to a prescribed angle. For example, an image representing the set state of the dial is displayed on the main display 16 in a case in which the main display 16 is horizontal. Horizontal in this case means a state in which the main display 16 is parallel to the optical axis L. In a case in which an image representing the set state of the dial is displayed, information on the contents of settings of the digital camera 1 can be included in the contents to be displayed on the main display 16.

Likewise, the sub-display can also be formed of a variable-angle display. Even in this case, a display on the sub-display can be controlled in conjunction with of the tilt of the sub-display.

<<Contents of Settings of Camera>>

In the above-mentioned embodiments, information on a shutter speed, a stop value, ISO sensitivity, the number of times of imaging that can be performed, an imaging mode, an image size, and remaining battery power have been displayed on the sub-display as the contents of settings of the camera during the normal display. However, the information to be displayed on the sub-display is not limited thereto. The amount of information to be displayed on the sub-display can be appropriately increased or reduced according to the size of the sub-display, or the like.

Further, in a case in which the contents of settings of the camera are displayed in a margin area in the display for a dark place, the contents to be displayed in the display for a dark place may be different from the contents to be displayed in the normal display. For example, information on a shutter speed, a stop value, ISO sensitivity, the number of times of imaging that can be performed, an imaging mode, an image size, and remaining battery power are displayed in the normal display; and only a shutter speed, a stop value, and ISO sensitivity may be displayed in the display for a dark place.

Further, the contents to be displayed may be adapted to be appropriately selected by a user.

Other Embodiments

A case in which the invention is applied to a digital camera has been described by way of example in the above-mentioned embodiments, but the application of the invention is not limited thereto. The invention can be applied to a camera using a silver halide film.

Further, a case in which the invention is applied to a lens-interchangeable camera has been described by way of example in the above-mentioned embodiments, but the invention can also be applied to a camera, which is integrated with a lens, likewise.

Furthermore, a case in which the invention is applied to a non-reflex camera has been described by way of example in the above-mentioned embodiments, but the invention can also be applied to a reflex camera likewise.

EXPLANATION OF REFERENCES

1: digital camera
2: lens
2a: lens drive unit
10: camera body
12: grip portion
14: lens mount
16: main display
18: sub-display
18a: sub-display illumination lamp
20: electronic view finder
20A: eyepiece portion
22: grip
24: thumb rest
30: shutter button
31: power supply lever
32: front command dial
33: shutter speed dial
33T: touch sensor
33a: dial plate
34: indicator
35: illumination button
36: function button
37: first rear command dial
38: second rear command dial
39: selector button
40: menu button
41: cancel button
42: play button
43: delete button
44: imaging condition-setting button
45: sensitivity dial
45a: dial plate
46: indicator
50: image sensor
52: image sensor drive unit
54: shutter
56: shutter drive unit
58: analog signal processing section
60: image data input unit
62: work memory
64: data memory
66: digital signal processing section
68: recording control unit
70: main display drive unit
72: sub-display drive unit
74: operation unit
76: brightness detection unit
78: memory card
80: system controller
80a: display control unit
80b: illumination lamp-control unit
82: sub-display illumination lamp-drive unit
100: dial
100A: first dial
100Aa: dial plate
100B: second dial
100Ba: dial plate
102: indicator
110: main display-support mechanism
400: sensitivity
A1: shutter speed
A2: stop value
A3: ISO sensitivity
A4: the number of times of imaging that can be performed
A5: imaging mode
A6: image size
A7: remaining battery power
B: area
I: indicator image
Im: image picture
Im1: image picture
Im2: image picture
L: optical axis
R: arrow
W: window image
W-1: window image
W-2: window image
S11 to S15: procedure of display processing on sub-display
S21 to S28: procedure of display processing on sub-display
S31 to S38: procedure of display processing on sub-display
S41 to S50: procedure of display processing on sub-display

What is claimed is:

1. A camera comprising:
a camera body including a first surface, a second surface facing the first surface, and a third surface crossing the first surface and the second surface;
a lens mount configured to have a lens mounted thereon, the lens mount being disposed on the first surface side;
a rotary dial operable to set a value of imaging;
a first display configured to display a live view image, the first display being disposed on the second surface side;
a second display configured to display the value that is set by the rotary dial, the second display being disposed on the third surface side; and
a system controller configured to control a display of the second display,
wherein in a case in which a lens is mounted on the lens mount, the system controller changes a brightness of the second display in accordance with a brightness of an imaging light incident on the camera through the lens.

2. The camera according to claim 1, wherein:
the rotary dial is disposed on the third surface side; and
the second display and the rotary dial are disposed on a same side with respect to an optical axis of the camera, in a view from the third surface side.

3. The camera according to claim 1, wherein the second display is configured not to display the live view image.

4. The camera according to claim 1, wherein the system controller changes the brightness of the second display in accordance with the brightness of the imaging light to raise a visibility of the second display.

5. The camera according to claim 1, wherein the system controller changes the brightness of the second display in stages based on a plurality of threshold values with respect to the brightness of the imaging light.

6. The camera according to claim 1, wherein the brightness of the imaging light is detected based on a brightness of image data obtained by imaging of the imaging light.

7. The camera according to claim 1, wherein:
the value of imaging is a shutter speed; and
the system controller raises a visibility of the value of the shutter speed on the second display after the rotary dial is operated.

8. The camera according to claim 1, wherein:
the first display is a variable-angle display; and
the first display is movable with respect the second surface side in a direction toward and away from the third surface side.

9. The camera according to claim 1, wherein the system controller is a microcomputer.

10. The camera according to claim 1, wherein the camera is a non-reflex digital camera.

11. The camera according to claim 1, further comprising a lens mounted on the lens mount.

12. The camera according to claim 2, further comprising a lens mounted on the lens mount.

13. The camera according to claim 3, further comprising a lens mounted on the lens mount.

14. The camera according to claim 4, further comprising a lens mounted on the lens mount.

15. The camera according to claim 5, further comprising a lens mounted on the lens mount.

16. The camera according to claim 6, further comprising a lens mounted on the lens mount.

17. The camera according to claim 7, further comprising a lens mounted on the lens mount.

18. The camera according to claim 8, further comprising a lens mounted on the lens mount.

19. The camera according to claim 9, further comprising a lens mounted on the lens mount.

20. The camera according to claim 10, further comprising a lens mounted on the lens mount.

* * * * *